United States Patent
Blong et al.

(10) Patent No.: US 10,242,007 B2
(45) Date of Patent: Mar. 26, 2019

(54) AUTOMATED MEDIA CLIPPING AND COMBINATION SYSTEM

(71) Applicant: Verizon Patent and Licensing Inc., Arlington, VA (US)

(72) Inventors: Devin Blong, Penngrove, CA (US); Kevin Flores, San Jose, CA (US); Mat Mejia, San Leandro, CA (US); Tushar Chaudhary, Mountain View, CA (US); Paresh Vakhariya, Cupertino, CA (US); Jason Goldsmith, San Jose, CA (US); Manish Sharma, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

(21) Appl. No.: 14/799,149

(22) Filed: Jul. 14, 2015

(65) Prior Publication Data

US 2017/0017658 A1    Jan. 19, 2017

(51) Int. Cl.
*G06F 17/30*    (2006.01)

(52) U.S. Cl.
CPC .. *G06F 17/30058* (2013.01); *G06F 17/30038* (2013.01)

(58) Field of Classification Search
CPC .......................................................... G06F 17/30
See application file for complete search history.

(56) References Cited

U.S. PATENT DOCUMENTS

| | | | | |
|---|---|---|---|---|
| 9,055,348 | B1* | 6/2015 | Kerns | H04N 21/812 |
| 2007/0118873 | A1* | 5/2007 | Houh | G06F 17/30746 |
| | | | | 725/136 |
| 2009/0292731 | A1* | 11/2009 | Park | G06F 17/30056 |
| | | | | 707/999.107 |
| 2012/0201519 | A1* | 8/2012 | Reynolds | H04N 21/25891 |
| | | | | 386/281 |
| 2013/0297638 | A1* | 11/2013 | Hein | H04N 21/252 |
| | | | | 707/758 |
| 2015/0293996 | A1* | 10/2015 | Liu | G06F 17/30823 |
| | | | | 707/723 |

* cited by examiner

*Primary Examiner* — Khanh B Pham

(57) ABSTRACT

A system may receive a search term from a user device. The system may identify a set of media files based on the search term, the set of media files including multiple media files. The system may automatically create a single media file by combining the multiple media files, from the set of media files, into the single media file. The system may output the single media file for presentation on the user device.

20 Claims, 18 Drawing Sheets

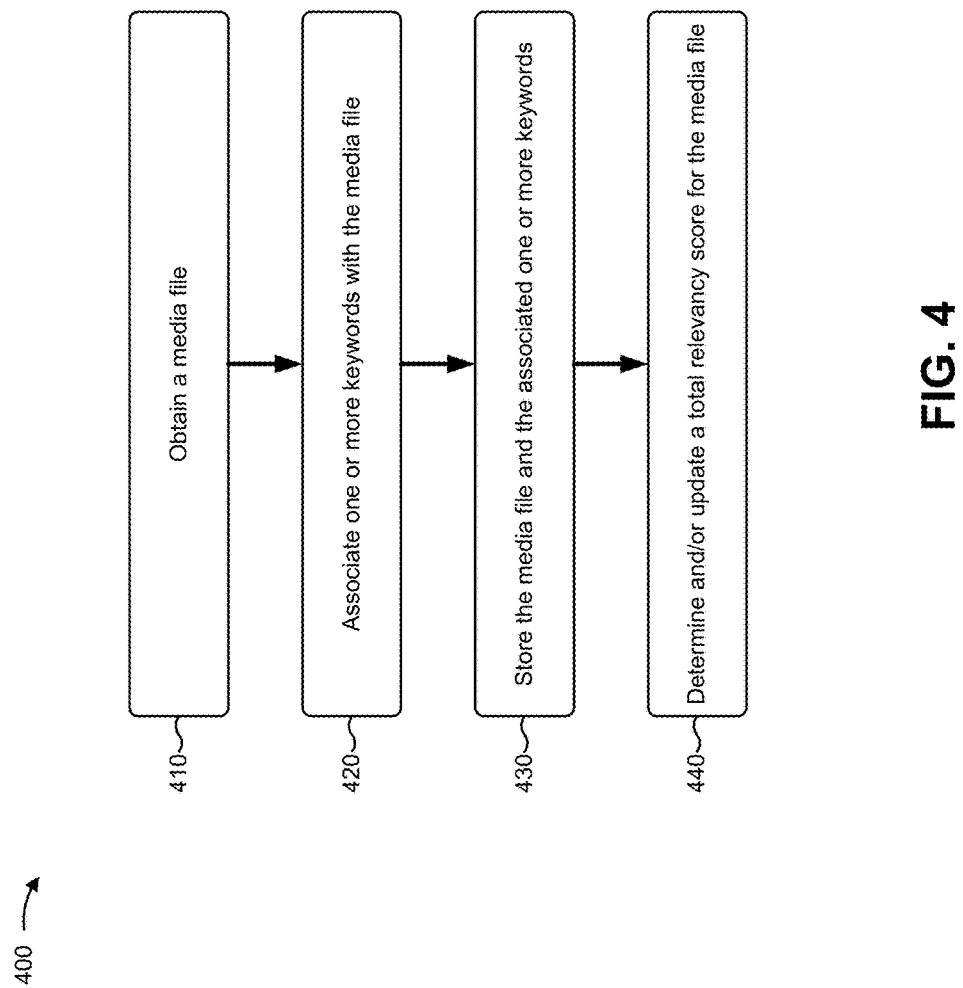

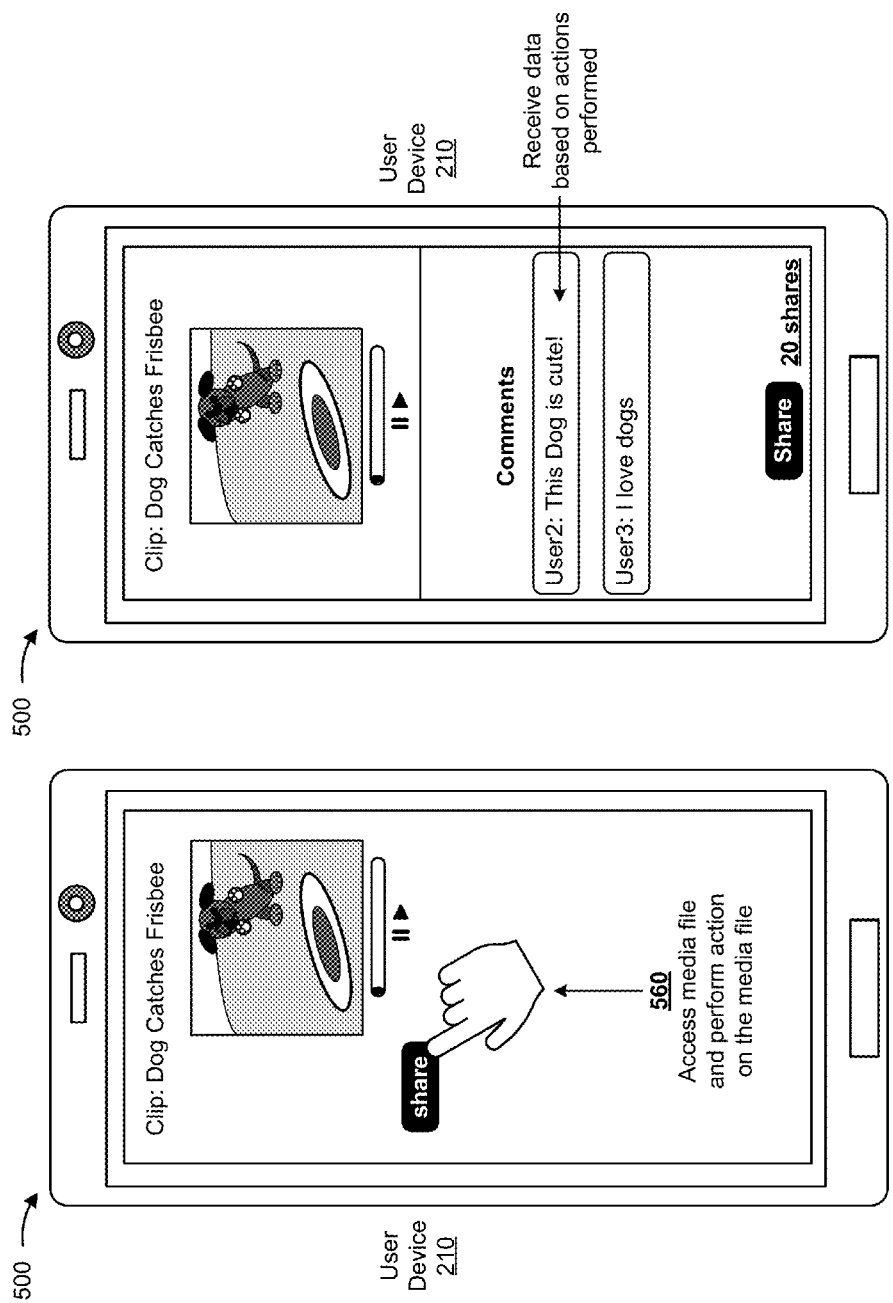

AUTOMATED MEDIA CLIPPING AND COMBINATION SYSTEM

BACKGROUND

Media content may refer to audio, video, image, and/or textual content. Media content may be manipulated and/or edited (e.g., using editing software) to create new media content. For example, media content may be manipulated and/or edited by cutting segments, by re-sequencing clips, by adding transitions and other special effects, or the like.

BRIEF DESCRIPTION OF THE DRAWINGS

FIG. 4 is a flow chart of an example process for generating media content for use in an automated media clipping and combination system;

FIGS. 5A-5F are diagrams of an example implementation relating to the example process shown in FIG. 4;

DETAILED DESCRIPTION OF PREFERRED EMBODIMENTS

Figure 1A:
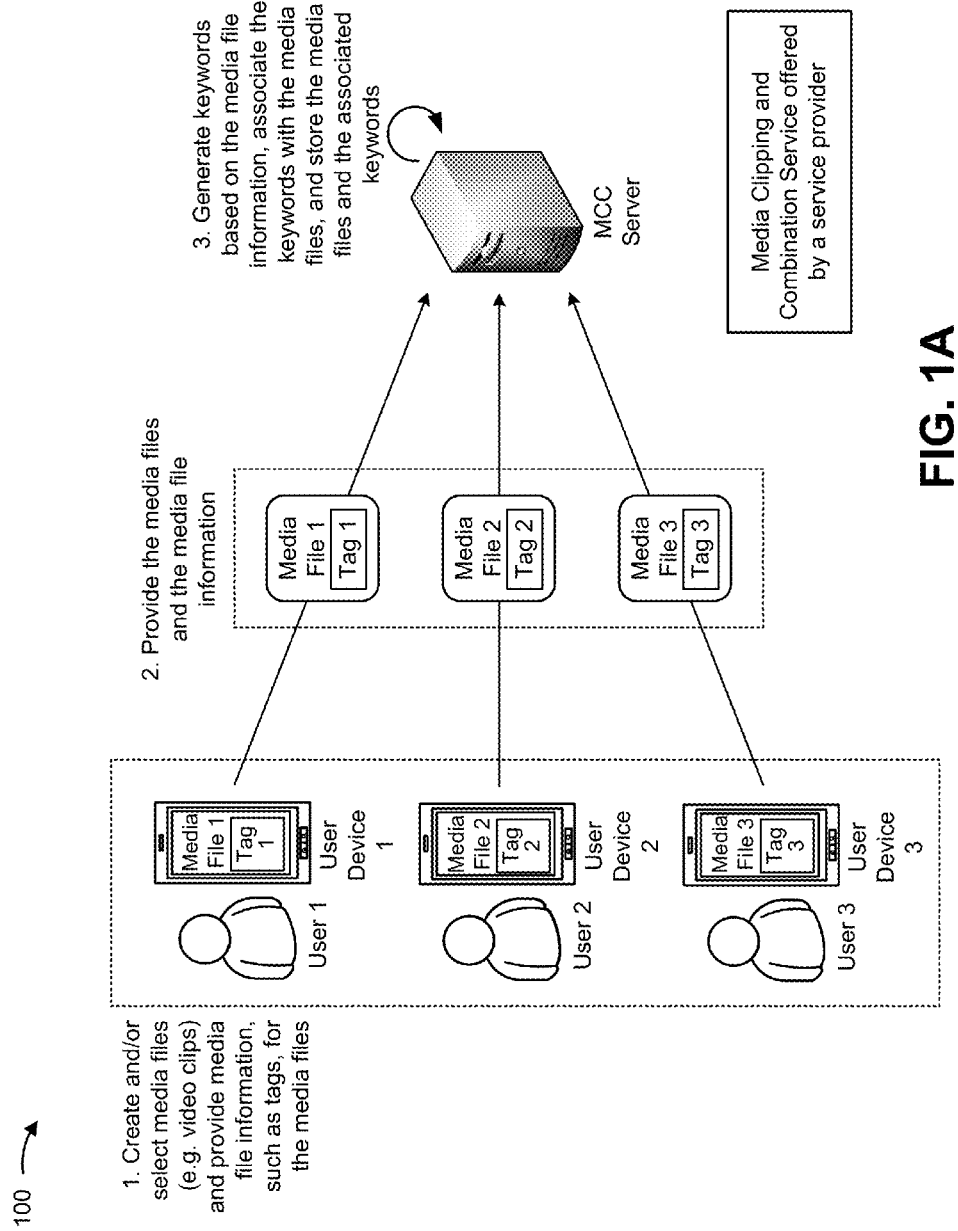
FIGS. 1A-1C are diagrams of an overview of an example implementation described herein.

The following detailed description of example implementations refers to the accompanying drawings. The same reference numbers in different drawings may identify the same or similar elements.

Media content, such as video content, audio content, image content, textual content, or the like, may be edited in many ways, transforming an original source work of the media content into new media content (e.g., by cutting segments, by creating shorter source work, by re-sequencing media content, by adding transitions and other special effects, etc.). Media content may take the form of a media file. A user may create and/or select media files (e.g., create video clips from original source work, select preexisting video clips, etc.) to identify a set of media files to be combined to create a media file of new media content (e.g., create and/or select video clips to combine to create a video montage).

To create the media file, for example, a user may manually cull through a collection of media files (e.g., a collection of home videos) to identify a set of media files (e.g., user selects and/or creates video clips from the home videos related to birthday celebrations) to be combined into a media file (e.g., a user may use a video editor to create a video montage of birthday celebrations, stitching together the video clips). This process is effective in creating a media file but may prove labor intensive for the user. This process is also subjective because the media file is created solely based on the user's preference (e.g., selection of which video clips to use, a sequence for the video clips, a quantity of video clips to include, etc.).

Identifying a set of media files to create a media file may be done automatically. For example, a user (e.g., a television network executive) may specify a database, including media files (e.g., a database of television episodes for a variety of shows included in the television network's new season line-up). Editing software may identify a set of media files by analyzing and/or selecting media files (e.g., full, unedited videos; video clips; etc.) based on certain characteristics of the media files (e.g., image quality, sound, transitions, speed of action, etc.). The set of media files may be used to create a media file automatically (e.g., create a preview trailer of the new season line-up by stitching together the video clips of the television episodes). Here, however, the database of media files must be predetermined, limiting the media content that may be used to create the media file.

Implementations described herein automatically create a single media file from a set of media files, identified from a dynamic database of media files and obtained from one or more users and/or one or more user devices of a system. The set of media files may be identified based on receiving a search term and identifying media files, for the set of media files, associated with a keyword matching (e.g., identical matching, synonym matching, stem matching, etc.) the search term. The media files for the set of media files may also be identified based on a relevancy score, associated with each of the media files and determined using a variety of relevancy factors (e.g., a measure of popularity of the media files, a measure of strength of an association between content of the media files and the search term, etc.).

Figure 1B:
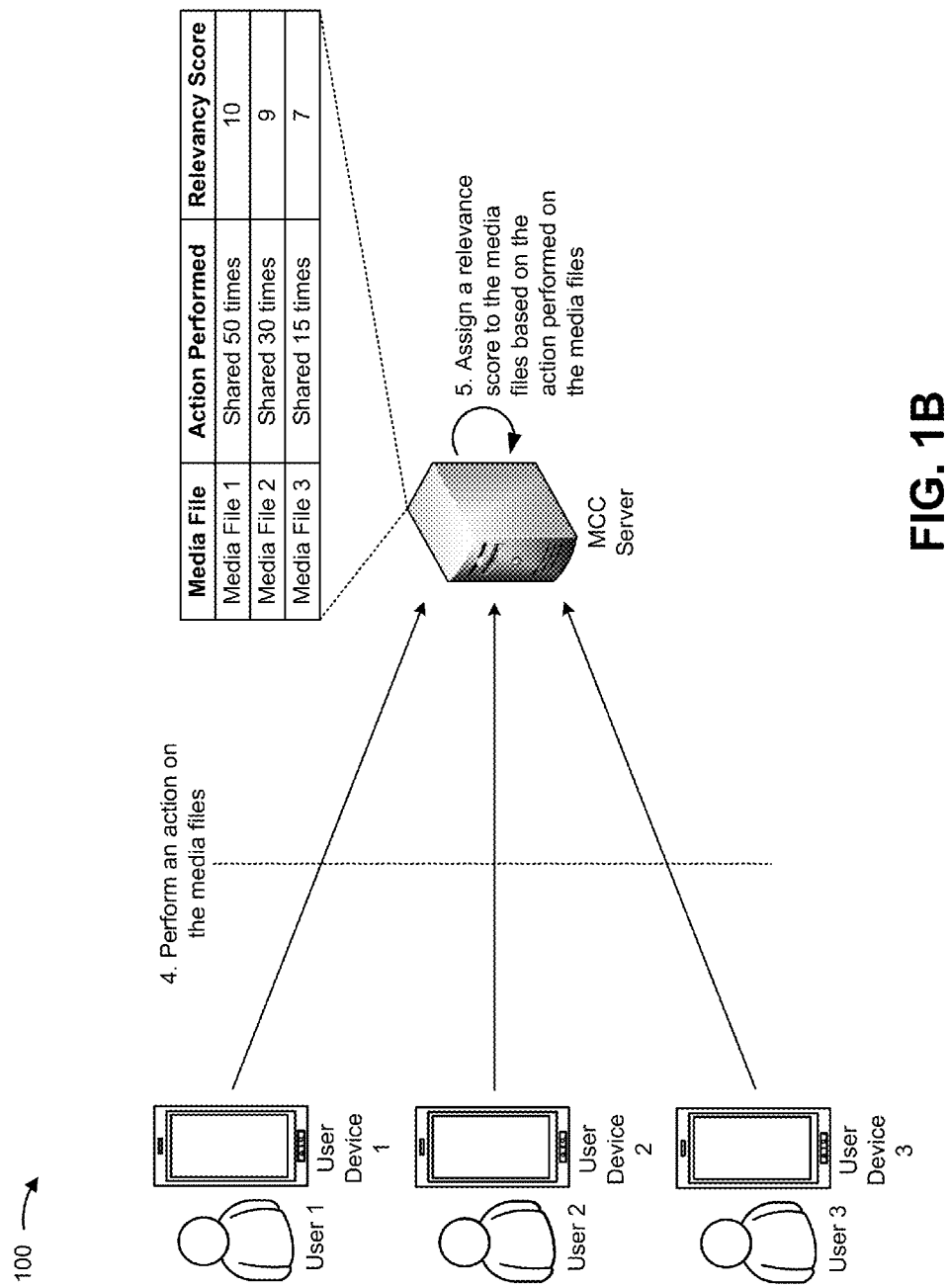
Figure 1C:
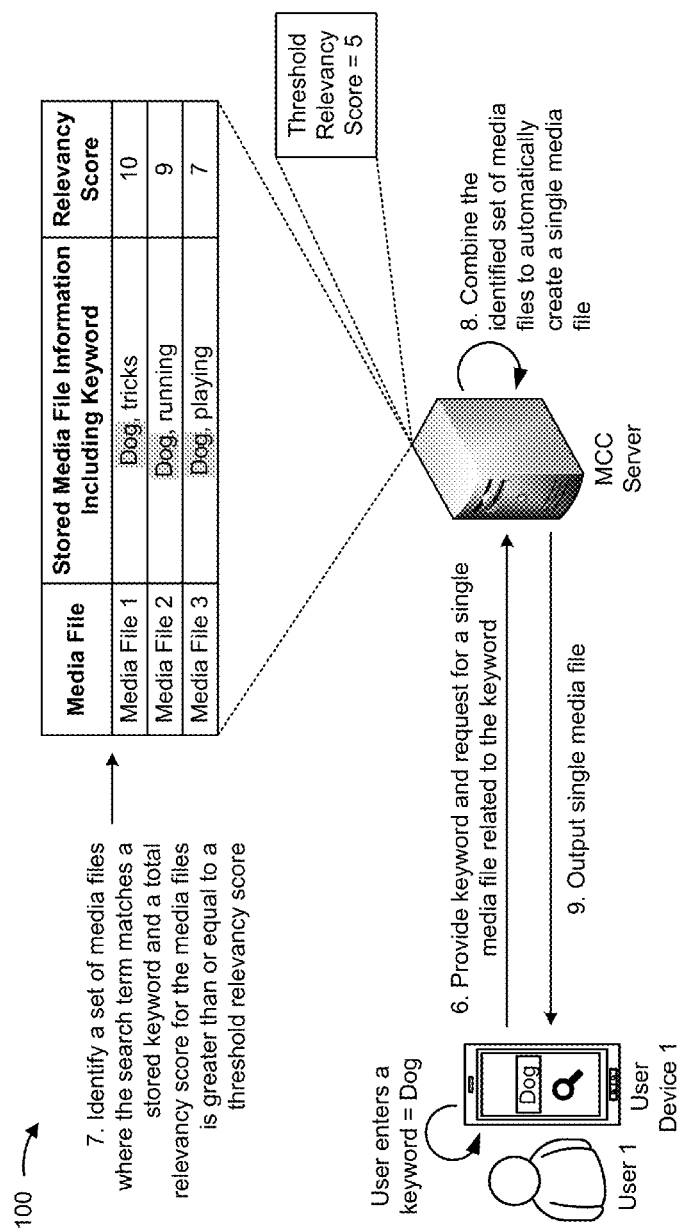

FIGS. 1A-1C are diagrams of an overview of an example implementation 100 described herein. Assume that a service provider offers a media clip and combination (MCC) service. Assume that one or more users (e.g., User 1, User 2, User 3, etc.) have accounts associated with the MCC service. Assume that the one or more users have an MCC application executing on a user device (e.g., User Device 1, User Device 2, User Device 3, etc.) and may use the MCC application to create and/or select media files of media content (e.g., videos, clips of videos, etc.).

As shown in FIG. 1A, and by reference number 1, the one or more users of a user device may create and/or select the media files (e.g., Media File 1, Media File 2, Media File 3, which are video clips). The one or more users may provide media file information (e.g., create/provide tags) for the media files, describing media content of the media files (e.g., Tag 1='dogs,' 'tricks' created for Media File 1 by User 1 about dogs performing tricks; Tag 2='dogs,' 'running' created for Media File 2 by User 2 about dogs running; Tag 3='dogs,' 'playing' created for Media File 3 by User 3 about dogs playing; etc.).

As shown in FIG. 1A, and by reference number 2, the one or more users may provide (e.g., by uploading) the media files to a MCC server, associated with the MCC service. As shown in FIG. 1A, and by reference number 3, the MCC server may generate keywords based on the media file information, associate the keywords with the media files, and store the media files and the associated key words. The associated keywords may be stored to permit the media files to be later identified.

As shown in FIG. 1B, and by reference number 4, the one or more users may perform an action on the media files (e.g., sharing the media files, commenting on the media files, accessing the media files, etc.). As shown in FIG. 1B, and by reference number 5, MCC server may assign a relevancy score to the media files based on the action performed on the media files. For example, a media file shared with greater frequency, amongst the one or more users of the MCC service, may be considered more popular and, therefore, may receive a higher relevancy score (e.g., Media File 1 shared 50 times receives a relevancy score of 10, Media File 2 shared 30 times receives a relevancy score of 9, Media File 3 shared 15 times receives a relevancy score of 7, etc.).

As shown in FIG. 1C, assume a user (e.g., User 1) desires a single media file (e.g., a video montage related to dogs). As shown in FIG. 1C, and by reference number 6, the user provides a search term (e.g., search term=dogs) to the MCC server and requests a single media file related to the search term. As shown in FIG. 7C, and by reference number 7, the MCC server identifies a set of media files associated with a stored keyword, where the search term and the stored keyword match (e.g., identical match, synonym match, stem match, etc.) and where the media files have a total relevancy score that satisfies a threshold relevancy score (e.g., a threshold relevancy score=5).

For example, the MCC server identifies Media File 1, with the associated stored keyword='Dog' matching the search term='Dog' and a total relevancy score=10, which satisfies the threshold relevancy score=5, for the set of media files. Additionally, the MCC server identifies Media File 2, with the associated stored keyword='Dog' matching the search term='Dog' and a total relevancy score=9, which satisfies the threshold relevancy score=5, for the set of media files. Additionally, the MCC server identifies Media File 3, with the associated stored keyword='Dog' matching the search term='Dog' and a total relevancy score=7, which satisfies the threshold relevancy score=5, for the set of media files.

As shown in FIG. 1C, and by reference number 8, the MCC server combines the identified set of media files to create a single media file (e.g., combine Media File 1, Media File 2, and Media File 3 to create a video montage about dogs). As shown in FIG. 1C, and by reference number 9, the MCC server outputs the single media file for presentation to a user device (i.e., User Device 1).

In this way, a single media file may be automatically created using a set of files obtained from one or more sources (e.g., one or more user devices) and determined to be of interest to viewers. Additionally, the user device may save processing time and resources by allowing the MCC server to automatically create the single media file. Additionally, the MCC server may save processing time and resources by efficiently and accurately identifying media files for the set of media files used to create a single media file in response to a user's request, based on the search term provided by the user.

While the description to follow will focus on media files where the media content is video (e.g., videos being original source work, video clips being media files, etc.), the description may apply to other types of media content (e.g., audio content, image content, textual content, etc.).

Figure 2:
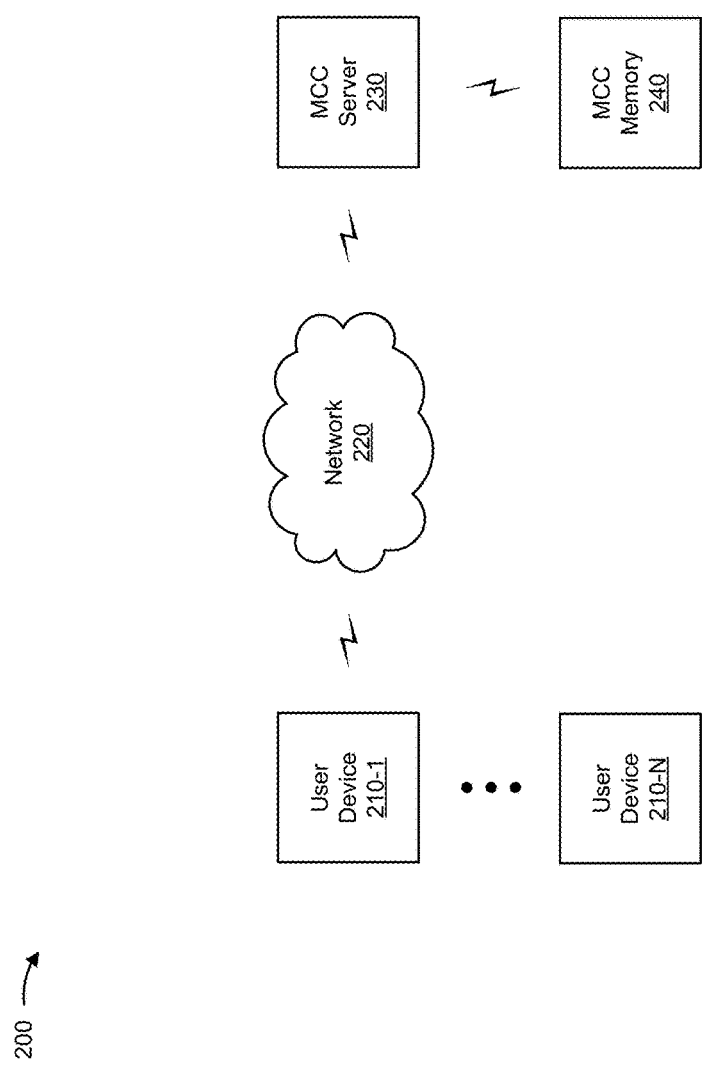
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-N (N≥1) (hereinafter referred to collectively as "user devices 210," and individually as "user device 210"), a network 220, a MCC server 230, and a MCC memory 240. Devices of environment 200 may interconnect via wired connections, wireless connections, or a combination of wired and wireless connections.

User device 210 may include one or more devices capable of receiving, generating, storing, processing, and/or providing information. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. User device 210 may include a client application for creating, selecting, and/or performing an action on media files. User device 210 may provide to MCC server 230 the media files and media file information, including search terms created and/or provided by a user of user device 210 and/or by user device 210. User device 210 may provide a search term and a request for a single media file, related to the search term and created from a set of media files associated with a stored keyword matching the search term provided. In some implementations, user device 210 may receive information from and/or transmit information to another device in environment 200.

Network 220 may include one or more wired and/or wireless networks. For example, network 220 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

MCC server 230 may include one or more server devices capable of storing, processing, and/or routing information. In some implementations, MCC server 230 may include a communication interface that allows MCC server 230 to receive information from and/or transmit information to other devices in environment 200. MCC server 230 may store, process, and/or route media files and media file information, including the keywords, provided by user devices 210. MCC server 230 may assign a relevancy score to the media files based on actions performed on the media files by user devices 210. MCC server 230 may obtain a search term from user device 210. MCC server 230 may create a single media file, related to the search term, from a set of media files associated with a stored keyword matching the search term, provided by user device 210. In some implementations, MCC server 230 may create the single media file based on the relevancy score assigned to the media files included in the set of media files.

MCC memory 240 may include one or more memory devices capable of processing, storing, and/or providing information. In some implementations, MCC memory 240 may process, store, and/or provide information, such as the media files provided by user devices 210. MCC memory 240 may store the media files as a database of information, as a table, as a linked list, as an index, or in another form or arrangement of data.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
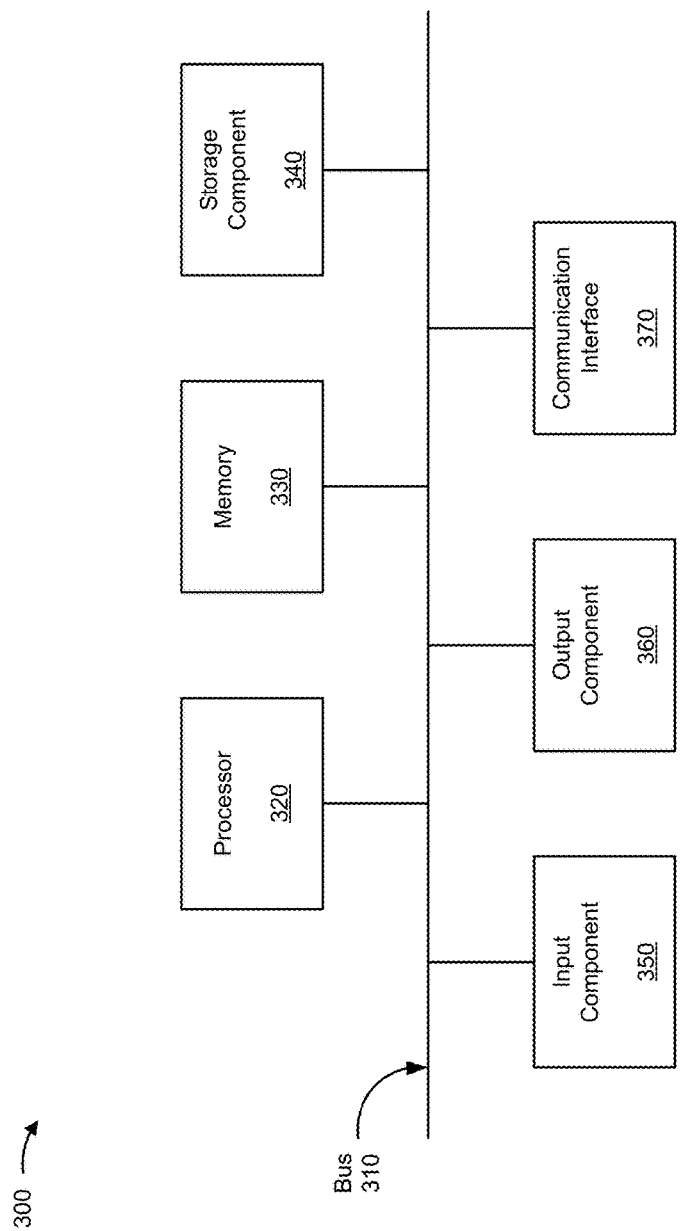
FIG. 3 is a diagram of example components of one or more devices of FIG. 2.

FIG. 3 is a diagram of example components of a device 300. Device 300 may correspond to user device 210, MCC server 230, and/or MCC memory 240. In some implementations, user device 210, MCC server 230, and/or MCC memory 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for generating media content for use in an automated media clipping and combination system. In some implementations, one or more process blocks of FIG. 4 may be performed by MCC server 230. In some implementations, one or more process blocks of FIG. 4 may be performed by another device or a group of devices separate from or including MCC server 230, such as user device 210 and/or MCC memory 240.

As shown in FIG. 4, process 400 may include obtaining a media file (block 410). For example, MCC server 230 may obtain a media file from user device 210. In some implementations, MCC server 230 may obtain media files from multiple user devices 210. A user of user device 210 may create the media file (e.g., recording a video, creating a video clip from an original video, etc.). User device 210 may include a client application (e.g., a MCC client application), including editing software, for creating the media file. In some implementations, a media file may be an entire original source work.

In some implementations, a media file may be a portion of an original source work (e.g., a video clip) created by clipping the original source work. Clipping refers to a capture and separation process of an original source work into separate and/or smaller media content. Clipping may be performed in various ways (e.g., creating video clips based on a producer specified break, where the producer may specify points in the original source work where the media content may be split, such as scene breaks, commercial breaks, or the like; creating video clips based on detecting scene change, via image or audio processing; creating video clips based on a set interval of time; creating video clips based on user selection where the user selects a length of time and a portion of the original source work to use for the video clips; etc.). In some implementations, user device 210 may automatically create the media file by selecting the portion of the original source work to be clipped (e.g., using the editing software to create video clips automatically using one or more of the various ways of clipping).

In some implementations, a user of user device 210 may select the media file (e.g., an existing video file from storage, an existing video file located on the Internet, etc.). In some implementations, user device 210 may automatically select the media file. In some implementations, user device 210 may automatically select the media file based on selection criteria (e.g., a file name, the media content of the media file, a creator name, media files created during a certain time period, etc.). In some implementations, MCC server 230 may create media files (e.g., video clips) from media files obtained from user devices 210, based on relevancy factors, discussed further herein below.

As further shown in FIG. 4, process 400 may include associating one or more keywords with the media file (block 420). For example, MCC server 230 may associate one or more keywords with the media file. A user of user device 210 may provide media file information describing media content of the media file. The media file information may include a tag, describing a subject matter of the video file, to MCC server 230.

A tag is a non-hierarchical keyword assigned to an item and/or information (e.g., the media file, an Internet bookmark, a digital image, another computer file, etc.) that helps describe the item and/or information. The tag allows the item and/or information to be located at a later time (e.g., by browsing, by searching, etc.). Tags are generally chosen informally and personally by the item and/or information's creator or by a user who has accessed the item and/or information. The user may be one or more users of user devices 210.

The media file information may also include other metadata for the media file (e.g., software used to create the media file, a date the media file was created, a time the media file was created, etc.). The media file information may be created by various sources (e.g., by one or more users of user devices 210, automatically by user devices 210, automatically by MCC server 230 upon obtaining the media file, etc.).

In some implementations, the user may share the media file with other users of user devices 210 and/or users of the MCC application. The other users may access the media file and provide additional tags for the media file. Additionally, or alternatively, user devices 210 may provide the additional tags for the media file. Media file information may also include other information (e.g., metadata, comments provided by users who accessed the media file, etc.). MCC server 230 may utilize the media file information to generate keywords for the media file. Additionally, or alternatively, MCC server 230 may associated the one or more keywords with the media file.

As further shown in FIG. 4, process 400 may include storing the media file and the associated one or more keywords (block 430). For example, MCC server 230 may store the media file obtained from user devices 210. Additionally, or alternatively, MCC server 230 may store the one or more keywords associated with the media file. In some implementations, MCC server 230 may store the media file and/or the one or more keywords, associated with the media file, in MCC memory 240. In some implementations, MCC server 230 may store the media file and/or the one or more keywords, associated with the media file, in another memory device or a collection of memory devices accessible by MCC server 230.

As further shown in FIG. 4, process 400 may include determining and/or updating a total relevancy score for the media file (block 440). For example, MCC server 230 may determine a relevancy score for the media file based on selecting one or more relevancy factors. For example, a relevancy factor may include a measure of popularity of the media file. MCC server 230 may consider various factors for determining popularity.

For example, MCC server 230 may determine popularity of the media file based on popularity by access. Popularity by access is a quantity of times the media file has been accessed. MCC server 230 may count and/or store the quantity of times the media file has been accessed to determine the relevancy score (e.g., a higher quantity of times the media file has been accessed, compared to other media files, may determine a higher relevancy score than the other media files; a lower quantity of times the media file has been accessed, compared to other media files, may determine a lower relevancy score than the other media files; an equal quantity of times the media file has been accessed, compared to other media files, may determine an equal relevancy score to the other media files; etc.). The quantity of times that a media file has been accessed may be useful in determining a measure of popularity of the media file because historical accesses of the media file may be a good predictor that the media file may be relevant to users in the future. When MCC server 230 accurately/efficiently identifies a set of media files to combine into a single media file based on relevancy of the media files, as determined by popularity by access, MCC server 230 may save processor resources by using media files, for the single media file, that are likely to be of interest to the user requesting the single media file.

Additionally, or alternatively, MCC server 230 may determine popularity of the media file based on popularity by action. Popularity of action is a quantity of times one or more users of user devices 210 has taken an action on the media file, such as attaching and/or sharing the media file with other users of user devices 210, expressing an interest in the media file, commenting about the media file through social media tools associated with the MCC application, or the like.

MCC server 230 may count and/or store the quantity of times the one or more users of user devices 210 has taken an action on the media file to determine the relevancy score (e.g., a higher quantity of times an action has been performed on the media file, compared to other media files, may determine a higher relevancy score than the other media files; a lower quantity of times an action has been performed on the media file, compared to other media files, may determine a lower relevancy score than the other media files; an equal quantity of times an action has been performed on the media file, compared to other media files, may determine an equal relevancy score to the other media files; etc.).

Additionally, or alternatively, MCC server 230 may analyze a type of action to determine the relevancy score (e.g., a positive comment directed to the media file may increase the relevancy score, liking the media file may increase the relevancy score, a negative comment directed towards the media file may decrease the relevancy score, disliking the media file may decrease the relevancy score, etc.).

The type of action (whether a positive action or a negative action) performed on a media file may be useful in determining a measure of popularity of the media file because positive actions (e.g., attaching and/or sharing the media file, expressing a positive interest in the media file, positively commenting on the media file) may be a good indicator that the media file will be relevant to users in the future, and negative actions (e.g., expressing negative interest in the media file, negatively commenting on the media file. etc.) may be a good indicator that the media file will not be relevant to users in the future. When MCC server 230 accurately/efficiently identifies a set of media files to combine into a single media file on relevancy of the media files, as determined by popularity by action, MCC server 230 may save processor resources by providing users with media files, within the single media file, that are likely to be of interest to the user.

Additionally, or alternatively, MCC server 230 may determine popularity of the media file based on fast forwarding and/or rewinding the media file. For example, fast forwarding through the media file to a particular point within the media file may indicate a low level of interest for the portion that was fast-forwarded but a high level of interest for the portion following the fast-forwarding. Rewinding the media file to a particular point within the media file may indicate a high level of interest. MCC server 230 may count and/or store the quantity of times one or more users of user devices 210 fast forwarded and/or rewound the media file to determine the relevancy score.

Fast forwarding or rewinding through the media file may be useful in determining a measure of popularity of the media file because fast forwarding or rewinding the media file (e.g., to reach a particular point in the media file) may be a good indicator that the media file will be relevant to users in the future. Fast forwarding (e.g., through a particular portion of the media file to move past the particular section, through the entire media file, etc.) may be a good indicator that the media file will not be relevant to users in the future. When MCC server 230 accurately/efficiently identifies a set of media files to combine into a single media file based on relevancy of the media files, as determined by fast forwarding and/or rewinding the media file, MCC server 230 may save processor resources by providing users with media files, within the single media file, that are likely to be of interest to the user.

Additionally, or alternatively, MCC server 230 may determine popularity of the media file based on a user's reaction to the media file (e.g., a facial reaction, an audio reaction, a volume associated with the audio reaction, a user's movement in response to the media file, an emotion experienced by the user, etc.). An audio/video device associated with user device 210 may capture the user's reaction to the media file. MCC server 230 may include processing software and/or tools to aggregate and/or analyze the user's reaction to the media file to determine a level of interest for the media file.

For example, a cheer, a high pitched noise, a comment using positive words (e.g., cool, great, awesome, etc.), or the like, may indicate a high level of interest, and thereby, increase the relevancy score. A "boo," a low pitched noise, a comment using negative words (e.g., bad, horrible, gross, etc.), or the like, may indicate a low level of interest, and thereby, decrease the relevancy score. In some implementations, a "boo," a low pitched noise, a comment using negative words (e.g., bad, horrible, gross, etc.), or the like, may indicate a high level of interest, as a user may desire to share a media file, generating a negative impression. These are some ways of determining popularity of the media file, and other ways are possible.

The type of user reaction (whether a positive reaction or a negative reaction) to a media file may be useful in determining a measure of popularity of the media file because positive reactions (e.g., cheering, smiling, using positive, audible comments in response to accessing the media file, etc.) may be a good indicator that the media file will be relevant to users in the future, and negative reactions (e.g., booing, frowning, using negative, audible comments in response to accessing the media file, etc.) may be a good indicator that the media file will not be relevant to users in the future. When MCC server 230 accurately/efficiently identifies a set of media files to combine into a single media file based on relevancy of the media files, as determined by popularity based on a user's reaction, MCC server 230 may save processor resources by providing users with media files, within the single media file, that are likely to be of interest to the user.

Another example of a relevancy factor used to determine the relevancy score is a strength of media content of the media file to the keyword. For example, Media File A is tagged as related to dogs and kites. MCC server 230 generates and associates keywords=dogs, kites for Media File A. However, Media File A is mostly about dogs and less about kites. MCC server 230 may assign a higher weight to the keyword=dogs associated with Media File A than the keyword=kites. Media file B is tagged as related to kites and parks. MCC server 230 generates and associates keywords=kites, parks for Media File B. However, Media File B is mostly about kites. MCC server 230 may assign a higher weight to the keyword=kites associated with Media File B than the keyword=kites for Media File A. In this way, if a user provided a search term=kites, MCC server 230 may likely determine Media File B to have a higher relevancy score than Media File A based on Media File B having a higher weight for the keyword=kites than Media File A.

The strength of media content of the media file may be useful in determining a measure of relevancy because media content strongly associated with a search term may be a good predictor that the media file may be relevant to the users, requesting media files using the same or similar search terms, in the future. Media content weakly associated with a search term may be a good predictor that the media file may not be relevant to the users. When MCC server 230 accurately/efficiently identifies a set of media files to combine into a single media file based on relevancy of the media files, determined by the strength of the media content, MCC server 230 may save processor resources by providing users with media files, within the single media file, that are likely to be of interest to the user.

In some implementations, each of the relevancy factors used for determining the relevancy score may be assigned a level of importance (e.g., the popularity by access may be assigned as a most important factor, the popularity by action may be assigned a second most important factor, the popularity based on a user's reaction may be assigned as a third most important factor, etc.) by MCC server 230 and/or another device or a user of MCC server 230 and/or another device.

Additionally, and/or alternatively, each of the relevancy factors may be weighted based on the assigned level of importance, where the most important factor may receive a higher weighting than a less important factor (e.g., the popularity by access may be determined as the most important factor and given a weight of 50%, the popularity by action may be determined of lesser importance and assigned a weight of 30%, the popularity based on a user's reaction may be determined as a factor of even lesser importance and may be assigned a weight of 20%, etc.).

Additionally, or alternatively, a total weight amount for all the relevancy factors considered in determining the relevancy score may equal 100%. The media file may receive a point value for each of the relevancy factors, based on weights of the relevancy factors. For example, for determining the point value based on the popularity by access, the media file may receive 0 points if the media file was accessed 0-10 times, 10 points if the media file that was accessed 11-100 times, 20 points if the media file that was accessed more than 100 times, etc.).

For determining the point value, for example, based on the popularity by action, the media file may receive 0 points if the media file was shared 0-10 times, 10 points if the media file that was shared 11-100 times, 20 points if the media file that was shared more than 100 times, etc.). For determining the point value, for example, based on the popularity of the user's reaction, the media file may receive 0 points if the media file received negative reactions by the users, the media file may receive 10 points if the media file received a mix of negative and positive reactions by the users, the media file may receive 20 points if the media file received positive reactions by the users, etc.).

The point value for the relevancy factors (e.g., 10 points) is multiplied by the weight given to each of the relevancy factors to calculate a relevancy score (e.g., a media file that is accessed 50 times may be given a relevancy score of 5 (10 points for the media file for being accessed 50 times×0.50); a media file that is shared 50 times may be given a relevancy score of 3 (10 points for the media file for being shared a 50 times×0.30); a media file, receiving a mix of negative and positive reactions by the users may be given a relevancy score of 2 (10 points for the media file for receiving a mix of positive and negative reactions by the users×0.20); etc.).

In some implementations, MCC server 230 may determine a total relevancy score by calculating a sum of one or more relevancy scores (e.g., a sum of one or more relevancy scores received for each of the relevancy factors considered in determining relevancy). For example, MCC server 230 may determine the total relevancy score=10 for a media file that is accessed 50 times, shared 50 times, and receives a mix of positive and negative accessed reactions. This is one way of determining the total relevancy score, and other ways may be possible.

In some implementations, MCC server 230 may select which of the relevancy factors to consider in determining the total relevancy score. In some implementations, a user of MCC server 230 may select which of the relevancy factors to consider in determining the total relevancy score. MCC server 230 may update the total relevancy score based on updates to the underlying data used to determine the total relevancy score (e.g., as the quantity of times the media file is accessed changes, as the quantity of positive and negative reactions by the users changes, as the quantity of the actions performed on the media file changes, etc.).

In some implementations, MCC server 230 may automatically create media files based on the total relevancy score. For example, MCC server 230 may aggregate and/or store data related to the relevancy factors and/or the total relevancy scores for the media files. Additionally, or alternatively, MCC server 230 may automatically create media files (e.g., video clips) from the media files obtained from user devices 210. In some implementations, MCC server 230 may automatically create the media files based on the relevancy factors (e.g., automatically creating a video clip based on a frequent rewinding action to a particular portion of a longer video file; automatically creating a video clip based on a positive user reaction to a particular portion of a longer video file; etc.).

In this way, MCC server 230 may create and/or obtain media files for future combination and clipping through a dynamic and interactive process, allowing for multiple users to provide the media files, for future use, using multiple user devices 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of generating media content for use in an automated media clipping and combination system.

Figure 5A:
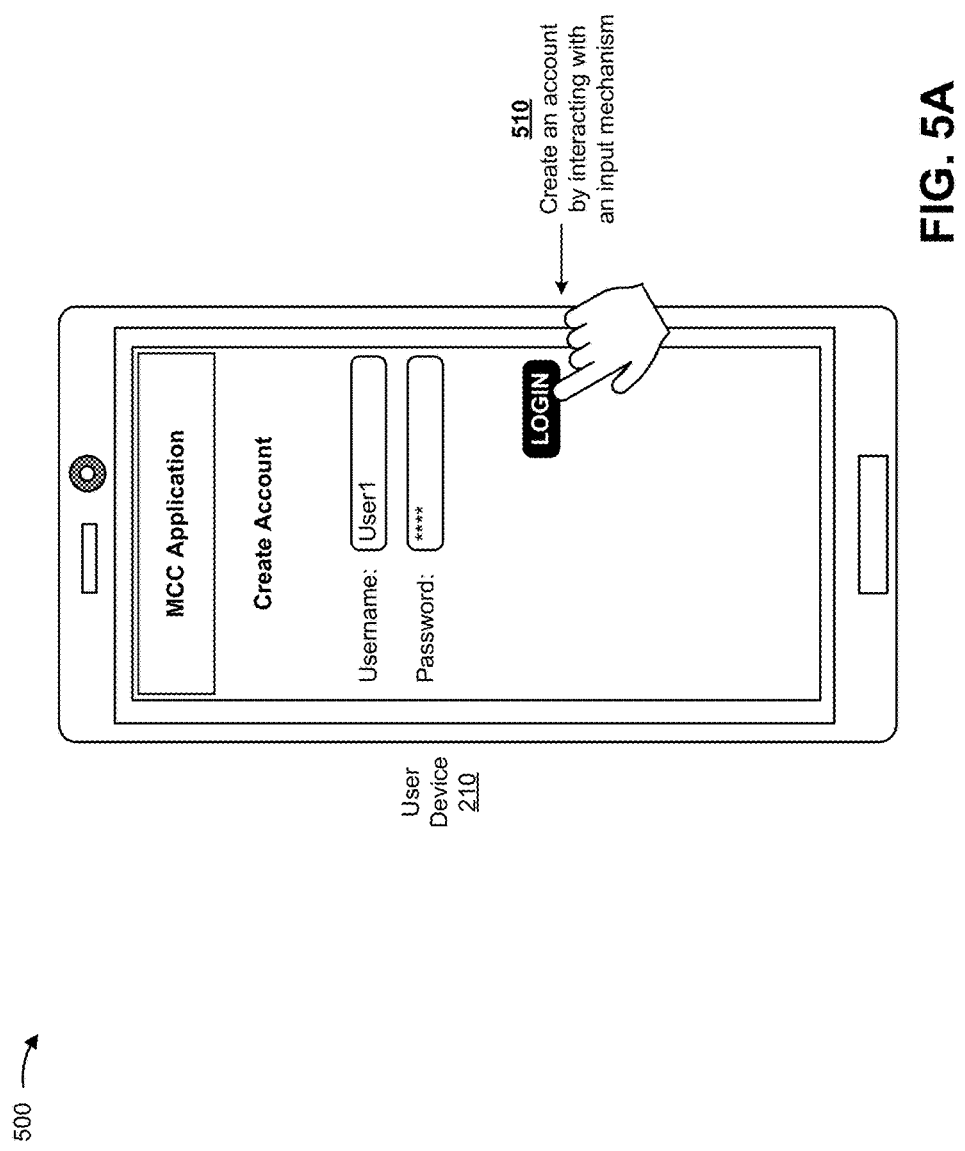
Figure 5B:
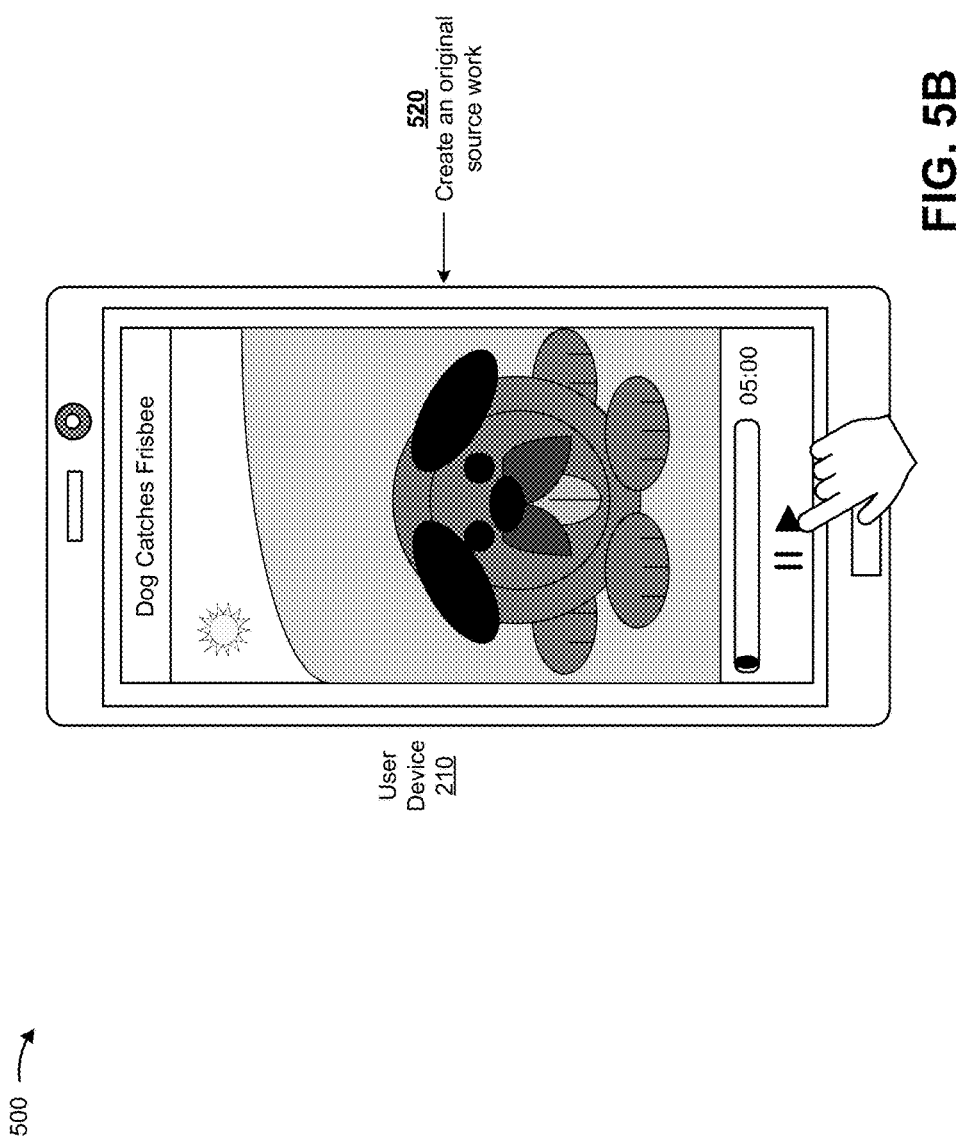

As shown in FIG. 5A, assume that a service provider offers a MCC service. Assume that a user device (e.g., user device 210) has a client application (e.g., MCC application), associated with the MCC service. As shown in FIG. 5A, and by reference number 510, a user (e.g., User 1) of user device 210 creates an account (e.g., by providing a username and password), associated with the MCC service, and interacts with an input mechanism (e.g., a "Login" button) to cause the user to log into the account. As shown in FIG. 5B, and by reference number 520, the user creates an original source work (e.g., by recording a video of a dog catching a Frisbee, where a running time for the video is 5 minutes).

Figure 5C:
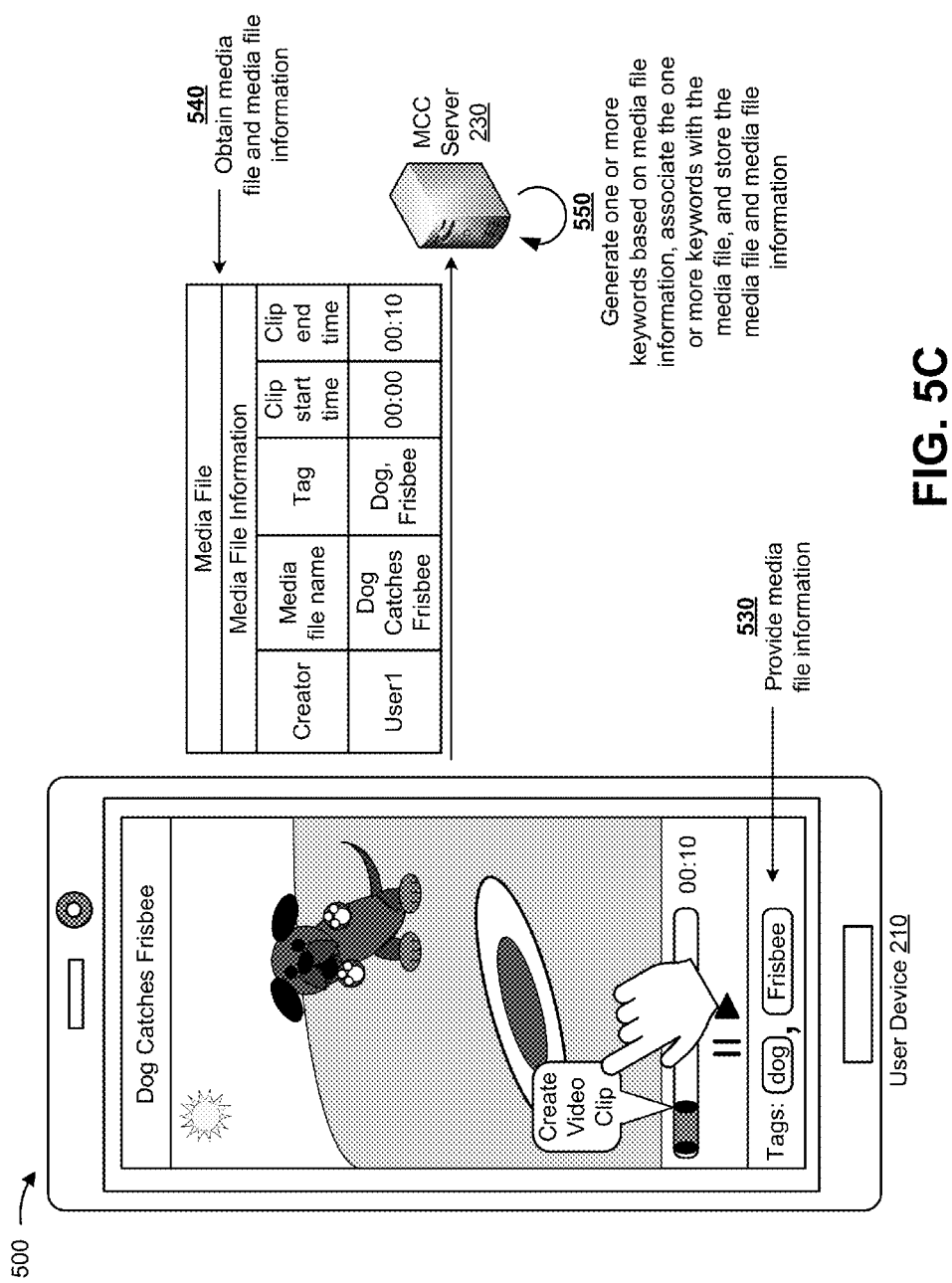

As shown in FIG. 5C, and by reference number 530, the user creates a media file (e.g., a video clip) by capturing a portion of the original source work (e.g., clipping the longer video recording of the dog catching the Frisbee and creating a video clip, where the running time for the video is 10 seconds). As shown in FIG. 5C, and by reference number 530, the user provides media file information (e.g., Tag='dog,' 'Frisbee') for the media file. As shown in FIG. 5C, and by reference number 540, MCC server 230 obtains the media file and the media file information provided by user device 210 (e.g., a media file name, a creator name, video clip start time, video clip end time, tags created by the user of user device 210, etc.). As shown in FIG. 5C, and by reference number 550, MCC server 230 generates one or more keywords based on the media file information, associates the one or more keywords with the media file, and stores the media file and the one or more keywords associated with the media file.

As shown in FIG. 5D, and by reference number 560, the user accesses the media file stored on MCC server 230 and performs an action on the media file, via MCC server 230 (e.g., the user shares the video of the dog catching the Frisbee, via MCC server 230, with other users of user devices 210, not shown, associated with the MCC service). As shown in FIG. 5E, and by reference number 570, user device 210 receives data, via MCC server 230, based on the action performed. For example, user device 210 receives comments, via MCC server 230, from other users of user devices 210 (not shown), reacting to the media file (e.g., User 2 says, "This Dog is cute!;" User 3 says, "I love dogs;" etc.). User device 210 also displays a quantity of times the media file was shared (e.g., 20 Shares), determined and/or provided by MCC server 230 (not shown).

Figure 5F:
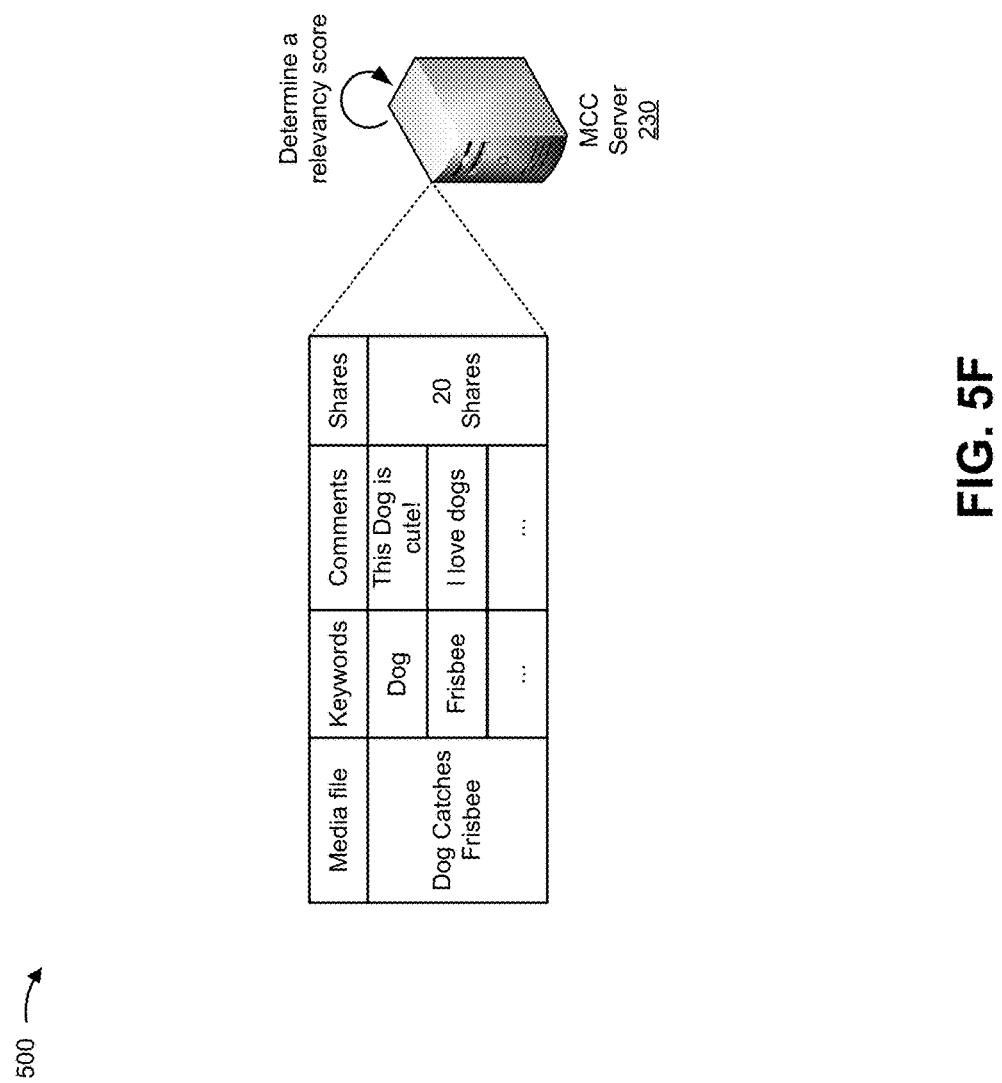

As shown in FIG. 5F, and by reference number 580, MCC server 230 determines a relevancy score for the media file based on the actions performed on the media file (e.g., determines a relevancy score=10 based on the positive comments and the quantity of shares).

As indicated above, FIGS. 5A-5F are provided merely as an example. Other examples are possible and may differ from what was described with regard to FIGS. 5A-5F.

Figure 6:
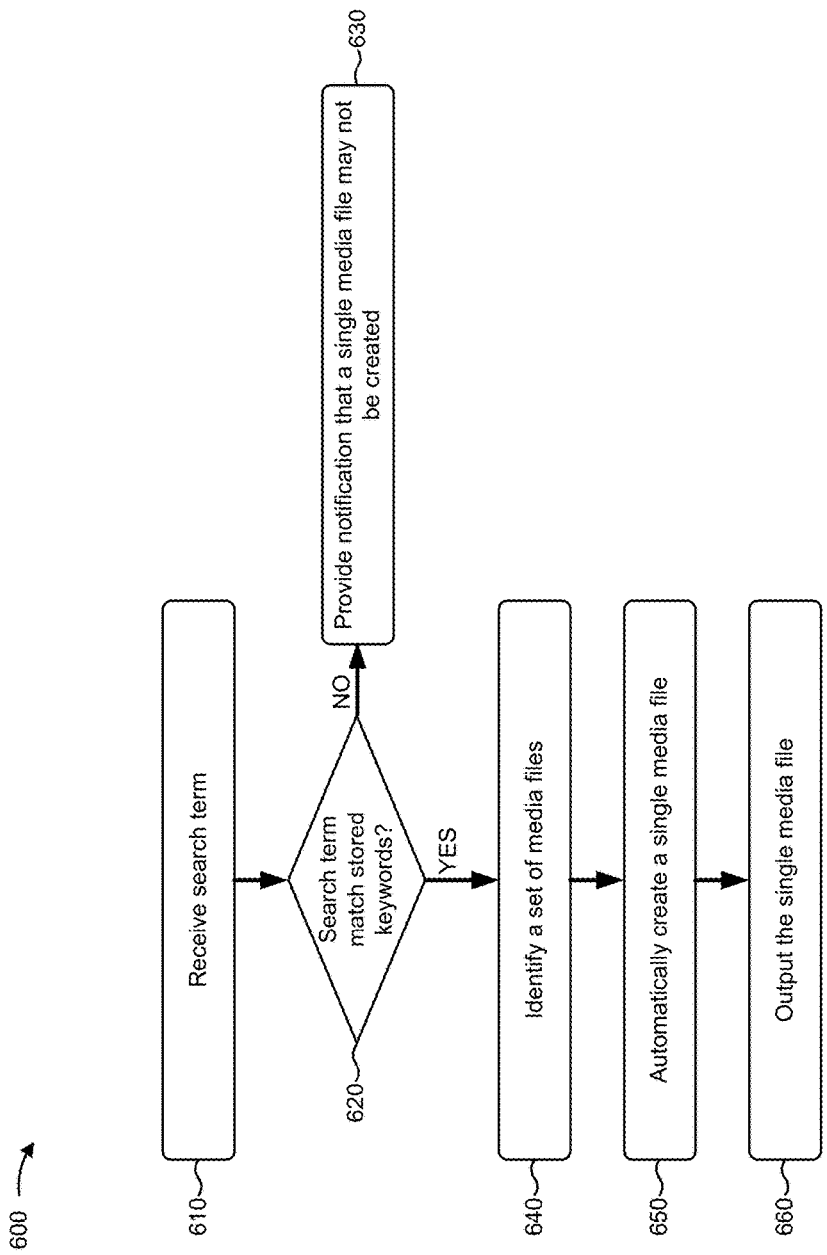
FIG. 6 is a flow chart of an example process for using an automated media clipping and combination system.

FIG. 6 is a flow chart of an example process 600 for using an automated media clipping and combination system. In some implementations, one or more process blocks of FIG. 6 may be performed by MCC server 230. In some implementations, one or more process blocks of FIG. 6 may be performed by another device or a group of devices separate from or including MCC server 230, such as user device 210 and/or MCC memory 240.

As shown in FIG. 6, process 600 may include receiving a search term (block 610). For example, MCC server 230 may receive a search term provided by user device 210. A user of user device 210 may enter a search term (e.g., Dog), requesting a single media file related to the search (e.g., a video montage of interesting dog videos/clips) and created from media files (e.g., video clips of dogs).

As further shown in FIG. 6, process 600 may include determining whether the search term matches a stored keyword (block 620). For example, MCC server 230 may compare the search term with stored keywords. The stored keywords are keywords generated from the media file information and associated with the media files previously obtained by MCC server 230. If the search term matches (e.g., identical match, synonym match, stem match, etc.) one of the stored keywords, then a set of media files may be identified for creating a single media. If the search term does not match one of the stored keywords, then a set of media files may not be identified for creating a single media file.

As further shown in FIG. 6, if the search term does not match one of the stored keywords (block 620—No), process 600 may include providing a notification that a single media file may not be created (block 630). For example, MCC server 230 may provide a notification that a single media file may not be created to user device 210. In some implementations, MCC server 230 may provide a notification that there are no media files associated with the search term. In some implementations, MCC server 230 may prompt the user of user device 210 to provide another search term.

In some implementations, MCC server 230 may provide a list of stored keywords associated with media files stored by MCC server 230, MCC memory 240, and/or another device for display on user device 210. A user of user device 210 may select a stored keyword, provided on the list, to provide as a search term to request a single media file related to the search term. In some implementations, if only one media file is associated with a stored keyword matching the search term provided, MCC server 230 may provide the one media file to user device 210 without creating a single media file from a set of media files.

As further shown in FIG. 6, if the search term matches one of the stored keywords (block 620—Yes), process 600 may include identifying a set of media files (block 640). For example, MCC server 230 may identify media files, associated with the stored keyword, to identify a set of media files. In some implementations, MCC server 230 may identify the media files, associated with the stored keyword, stored in MCC memory 240.

In some implementations, MCC server 230 may identify the media files for the set of media files based on one or more additional criteria (e.g., a criteria different than matching the search term with a stored keyword). For example, MCC server 230 may identify the media files, for the set of media files, based on a total relevancy score for each of the media files satisfying a threshold relevancy score (e.g., selecting media files with a relevancy score greater than or equal to 5, for the set of media files, where a threshold relevancy score is equal to 5).

In some implementations, MCC server 230 may identify the media files, where a combined total relevancy score (e.g., adding together the total relevancy score for each of the media files selected) satisfies a combined threshold relevancy score. For example, assume that a combined threshold relevancy score is equal to 10. Media File X has a total relevancy score of 5, Media File Y has a total relevancy score of 10, and Media File Z has a total relevancy score of 5 to give a combined total relevancy score of 20. Media File X, Media File Y, and Media File Z may identified for the set of media files because the combined total relevancy score for the three files (5+10+5=20) is greater than the combined threshold relevancy score (e.g., the combined total relevancy score=20 is greater than the combined threshold relevancy score=10).

In some implementations, MCC server 230 may automatically generate the threshold relevancy score and/or the combined threshold relevancy score based on historical data (e.g., setting the threshold relevancy score and/or the combined threshold relevancy score above a certain value to generate a single media clip that is known to historically receive positive comments; setting the threshold relevancy score and/or the combined threshold relevancy score above a certain value generates a single media clip of a desired length; etc.).

In some implementations, a user of MCC server 230 may determine the threshold relevancy score and/or the combined threshold relevancy score. In some implementations, a user of user device 210 and/or another device may determine the threshold relevancy score and/or the combined threshold relevancy score.

In some implementations, MCC server 230 may identify the media files for the set of media files based a file size for each of the media files (e.g., identify a set of media files where each of the media files has a file size that is larger than a threshold file size; identify a set of media files where each of the media files has a file size that is smaller than a threshold file size; etc.).

In some implementations, MCC server 230 may identify the media files for the set of media files based a total file size of the set of media files (e.g., identify a set of media files where a total file size of the set of media files is larger than a threshold file size; identify a set of media files where a total file size of the set of media files is smaller than a threshold file size; etc.).

In some implementations, MCC server 230 may identify the media files for the set of media files based on selecting a particular quantity of media files for the set of media files (e.g., selecting a quantity greater than a particular quantity of media files for the set of media files; selecting a quantity less than a particular quantity of media files for the set of media files; etc.).

In some implementations, MCC server 230 may identify the media files for the set of media files based on selecting media files of a particular quality for the set of media files (e.g., selecting media files that have a high-definition (HD) video quality; selecting media files that have a standard-definition (SD) video quality; etc.).

These are a few examples of identifying the media files for the set of media files based on one or more additional criteria, and other ways are possible.

As further shown in FIG. 6, process 600 may include automatically creating a single media file (block 650). For example, MCC server 230 may retrieve each of the media files identified for the set of media files. Additionally, or alternatively, MCC server 230 may rank the media files to determine an order to combine the media files into a single media file. The ranking order may be determined in various ways.

For example, the ranking order may be associated with the total relevancy score of each of the media files identified for the set of media files (e.g., ranking the media files based on an increasing relevancy score; ranking the media files based on a decreasing relevancy score; etc.). Combining the media files in a ranking order based on the total relevancy score (e.g., combining the media file in a ranking order of an increasing total relevancy score to build intensity/interest for the combined media file; combining the media file in a ranking order of a decreasing total relevancy score to present the most interesting/relevant clips first; etc.) may be a good predictor that the media file may be relevant to the users, requesting media files using the same or similar search terms, in the future.

Additionally, combining the media files in a ranking order based on the total relevancy score may be a good predictor that the media file may be of a similar interest level to the users, requesting media files using the same or similar search terms, in the future. When MCC server 230 accurately/ efficiently combines a set of media files based on a ranking order, as determined by the total relevancy score of the media files, MCC server 230 may save processor resources by providing users with media files, within the single media file, that are likely to be of interest to the user.

In some implementations, the ranking order may be associated with the file size for each of the media files identified for the set of media files (e.g., ranking the media files based on an increasing file size; ranking the media files based on a decreasing file size; etc.). Combining the media files in a ranking order based on the file size (e.g., presenting the largest files first, presenting the largest files last, etc.) may be a good predictor that the media files may be interesting/relevant to the users, requesting media files using the same or similar search terms, in the future. When MCC server 230 accurately/efficiently combines a set of media files based on a ranking order, as determined by the file size, MCC server 230 may save processor resources by providing users with media files, within the single media file, that are likely to be of interest to the user.

In some implementations, the ranking order may be associated with the quality for each of the media files identified for the set of media files (e.g., combining the media files based on grouping and/or combining all the media files of a HD quality first; combining the media files based on grouping and/or combining all the media files of a SD quality first; etc.).

These are a few examples of determining ranking order for combining the media files to create a single media file, and other ways are possible.

Additionally, or alternatively, MCC server 230 may combine (e.g., by stitching) the media files, identified for the set of media files, to create a single media file. For example, MCC server 230 may add a second file, identified in the set of media files, to the end of a first file, identified in the set of media files. MCC server 230 may add a third file, identified in the set of media files, to the second file. MCC server 230 may continue to add files until all the files, identified in the set of files, have been used.

In some implementations, MCC server 230 may add transitions between the media files (e.g., a fade in/out, a blank screen, a title screen, etc.). In some implementations, MCC server 230 may add audio to the single media file. These are a few examples of combining media files to create a single media file, and other ways are possible.

As further shown in FIG. 6, process 600 may include outputting the single media file (block 660). For example, MCC server 230 may output the single media file to user device 210. MCC server 230 may output the single media file for presentation on user device 210. In some implementations, a user of user device 210 may perform actions on the single media file (e.g., sharing the single media file, accessing the single media file, commenting on the single media file, etc.). In some implementations, MCC server may store the single media file as a new media file that may be available to other users and/or may be used in creating another single media file.

By creating and/or storing a single media file, MCC server 230 can save processing resources by not having to recreate the single media file if another user requests the same single media file using the same search term as used for the stored single media file.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
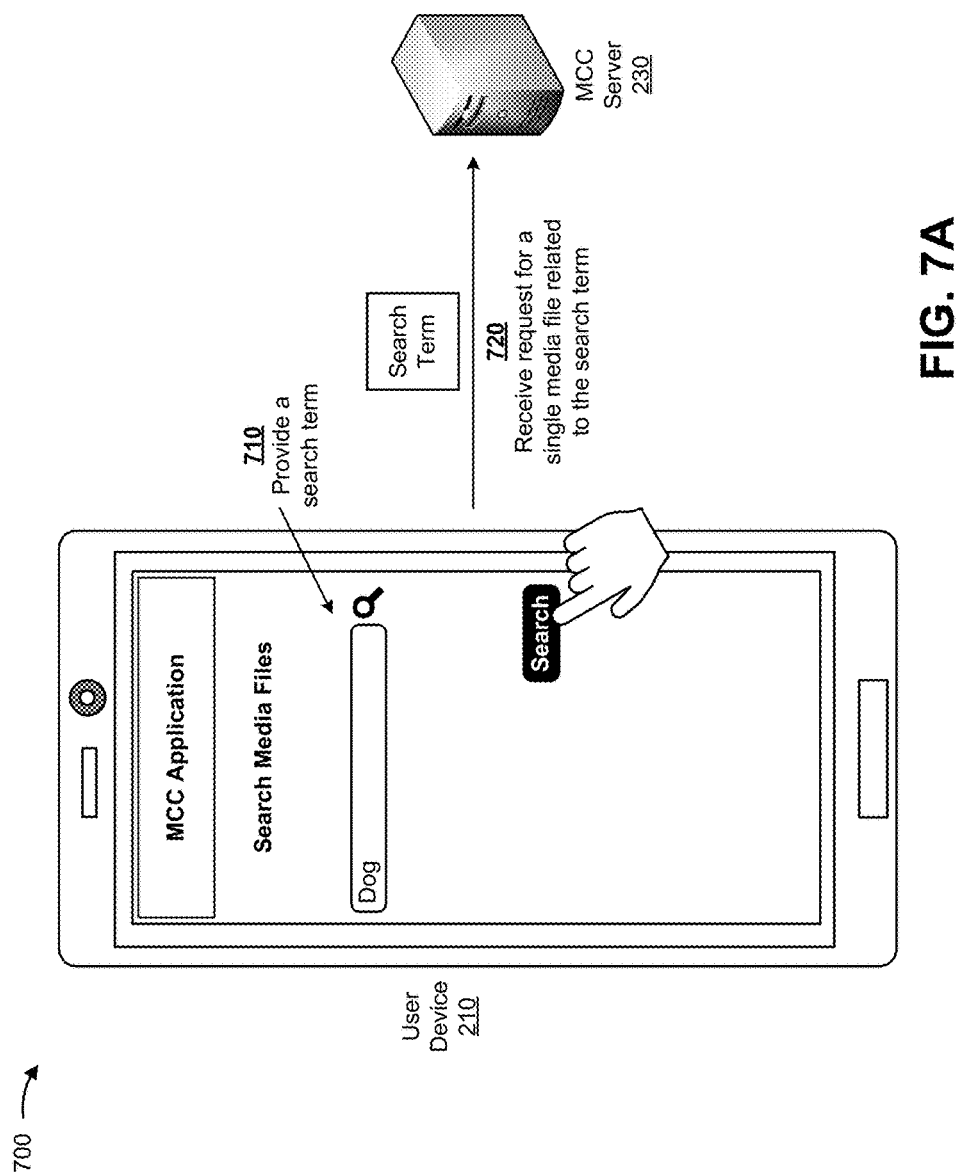
FIGS. 7A-7C are diagrams of an example implementation relating to the example process shown in FIG. 6.
Figure 7B:
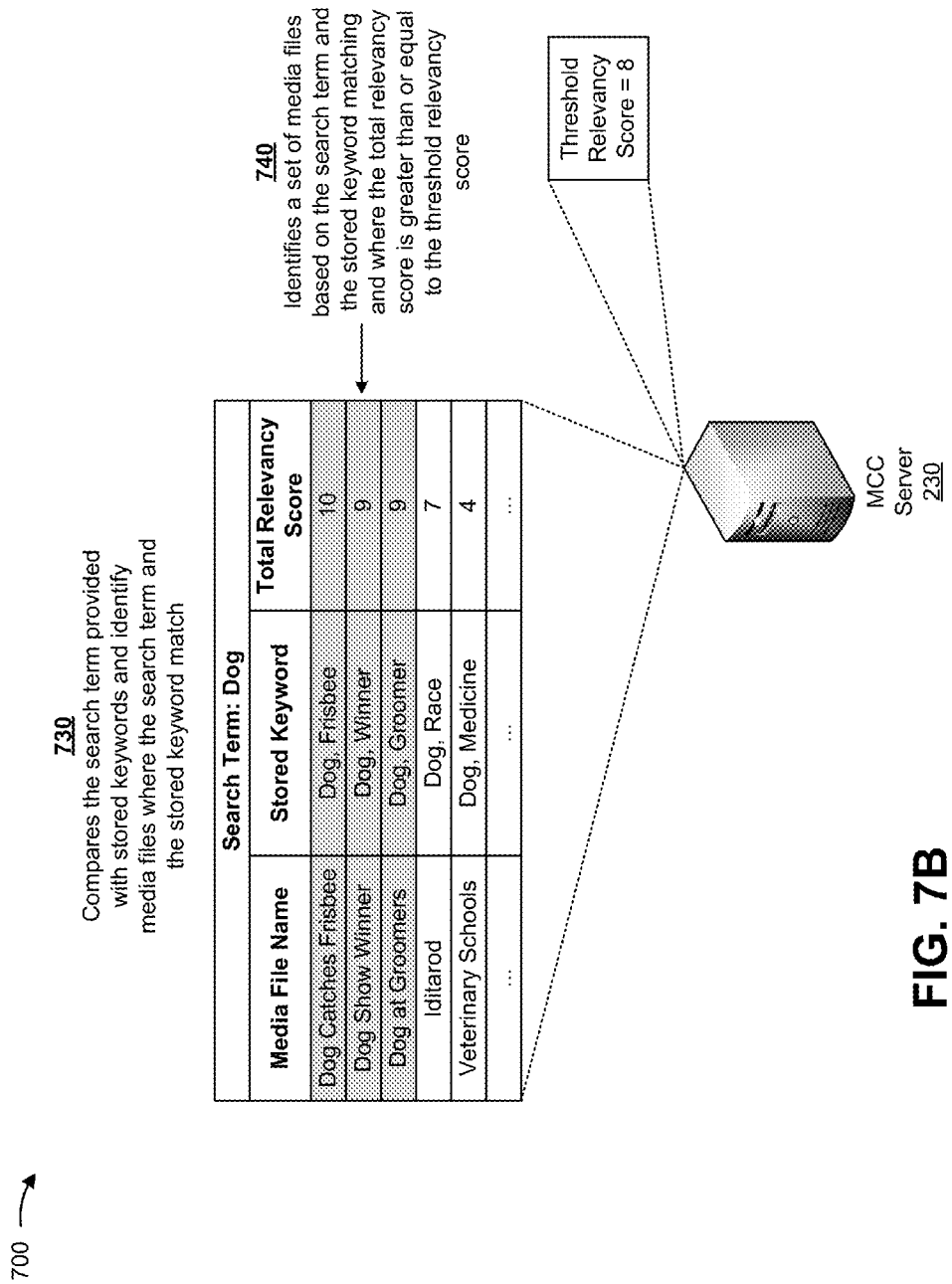
Figure 7C:
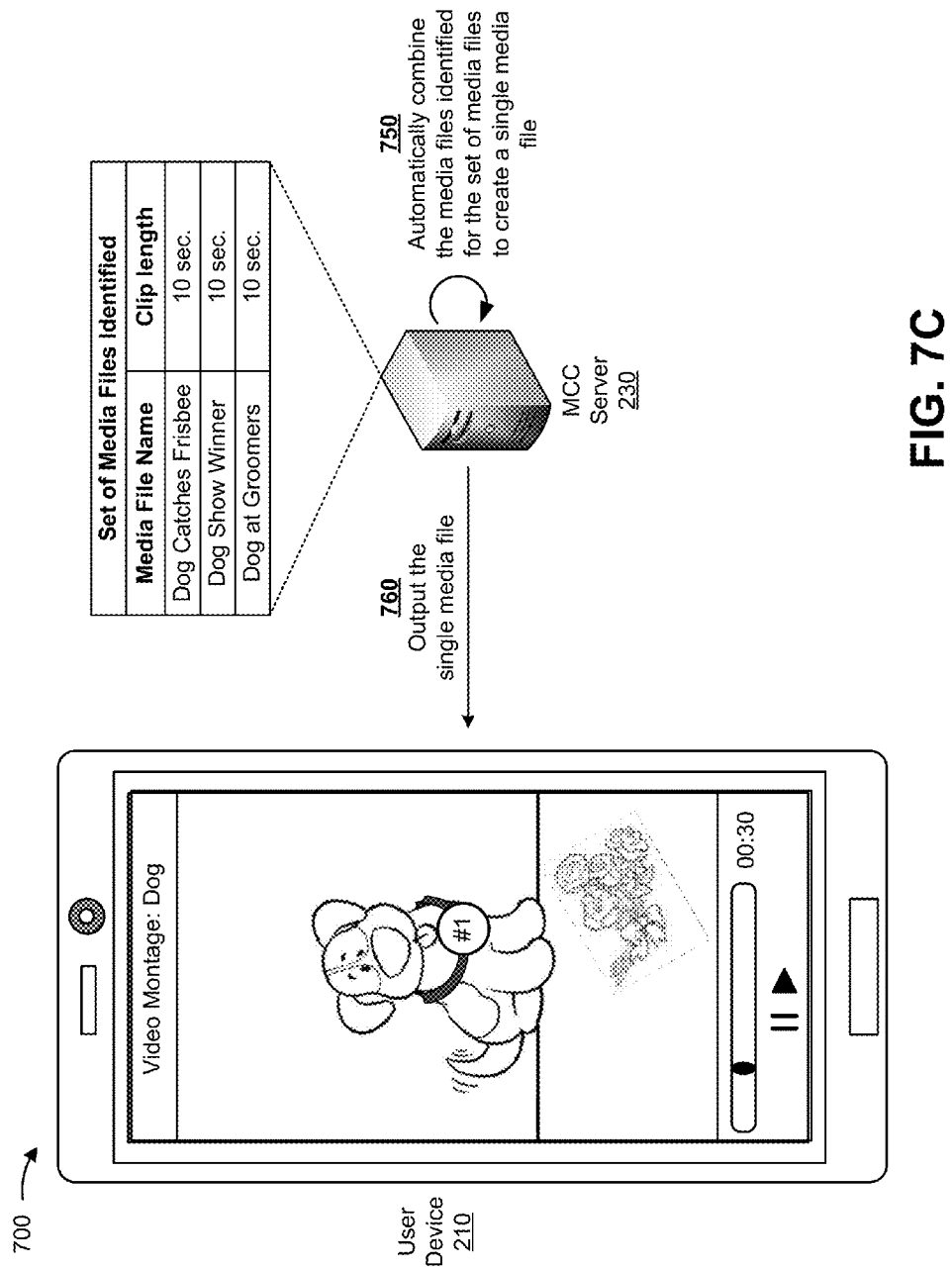

FIGS. 7A-7C are diagrams of an example implementation 700 relating to example process 600 shown in FIG. 6. FIGS. 7A-7C show an example of using an automated media clipping and combination system.

As shown in FIG. 7A, assume a user of user device 210 desires to obtain a single media file by combining media files, related to a search term provided by the user (e.g., the user desires a video montage combining video clips related to dogs). As shown in FIG. 7A, and by reference number 710, the user provides a search term (e.g., user of user device 210 enters the search term=Dog) into an MCC application (e.g., MCC Application) on user device 210 and associated with a MCC service provider. As shown in FIG. 7A, and by reference number 720, MCC server 230 receives a request for a single media file, from user device 210, related to the search term.

As shown in FIG. 7B, assume that MCC server 230 has a threshold relevancy score equal to 8. As shown in FIG. 7B, and by reference number 730, MCC server 230 compares the search term (e.g., the search term=Dog) with stored keywords and identifies media files based on the search term matching a stored keyword. MCC server 230 identifies five media files (e.g., video clips) entitled "Dog Catches Frisbee," "Dog Show Winner," "Dog at Groomers," "Iditarod," and "Veterinary Schools," where each of the media files is associated with a stored keyword=dog and where the search term=dog, provided by the user, matches the stored keyword.

As shown in FIG. 7B, and by reference number 740, MCC server 230 identifies a set of media files, including the media files where the search term matches the stored keyword, and where the media files meet an additional criteria of each of the media files having a total relevancy score greater than or equal to a threshold relevancy score (e.g., identifying the video clip entitled "Dog Catches Frisbee" with a total relevancy score=10; identifying the video clip entitled "Dog Show Winner" with a total relevancy score=9; identifying the video clip entitled "Dog at Groomers" with a total relevancy score=9; etc.).

As shown in FIG. 7C, and by reference number 750, MCC server 230 automatically combines the media files, identified for the set of media files, to create a single media file (e.g., combining the video clip entitled "Dog Catches Frisbee" and 10 seconds in length, the video clip entitled "Dog Show Winner" and 10 seconds in length, and the video clip entitled "Dog at Groomers" and 10 seconds in length, to create a single video montage, 30 seconds in length, related to dogs).

As shown in FIG. 7C, and by reference number 760, MCC server 230 outputs the single media file to user device 210 (e.g., providing a 30 second video montage automatically created by combining video clips with the associated keyword=dog and having a relevancy score greater than or equal to 8). The user of user device 210 may now view the single media file on a display of user device 210 (e.g., the user may watch the video montage of dogs).

As shown in FIG. 7C, and by reference number 770, MCC server 230 stores the single media file so that the user of user device 210 may access the video clip at a later time. For example, MCC server 230 may generate a link to the single media file and provide the link to user device 210. The user may use the link to access the single media file at a later time.

As indicated above, FIGS. 7A-7C are provided merely as an example. Other examples are possible and may differ from what was described with regard to FIGS. 7A-7C.

Figure 8A:
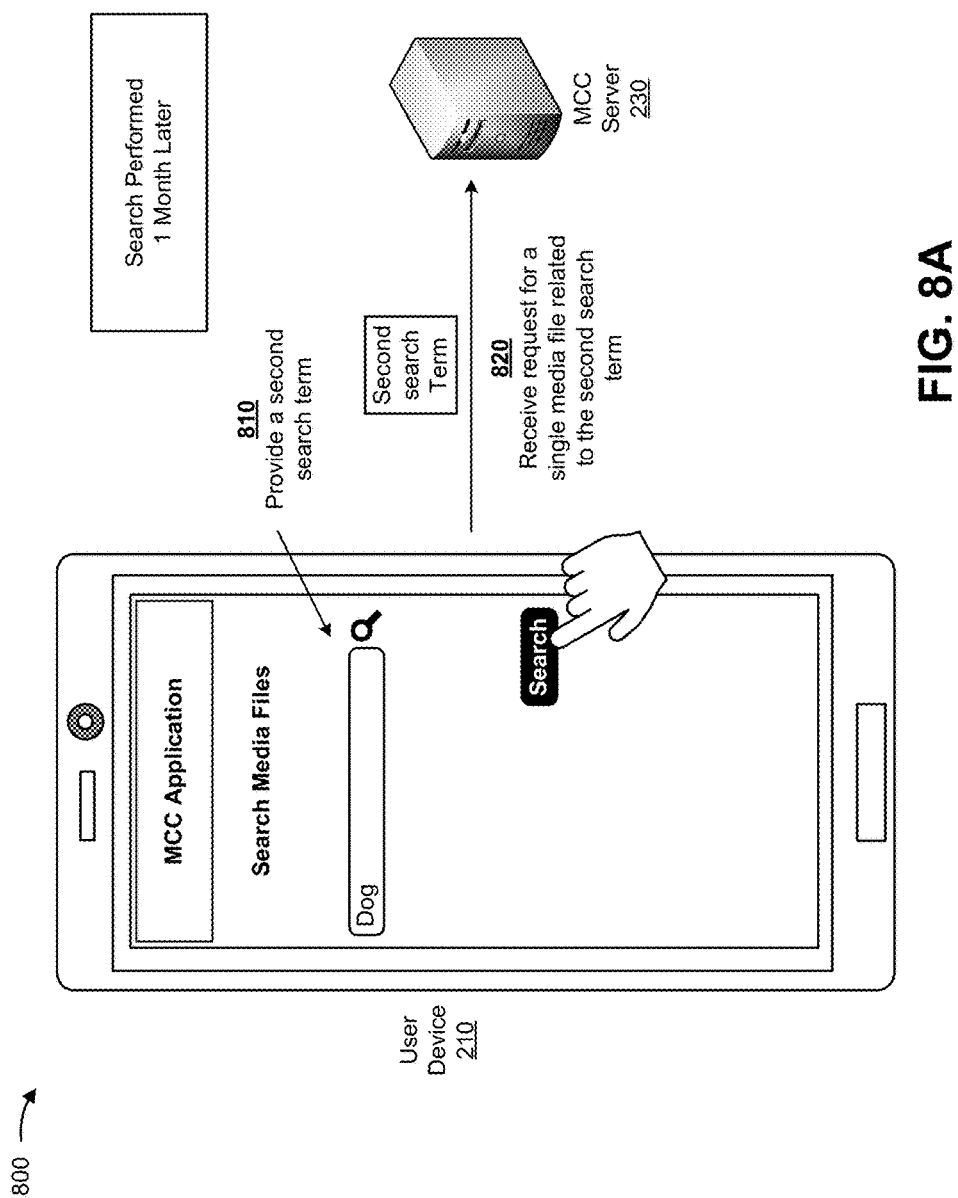
FIGS. 8A-8C are diagrams of an example implementation relating to the example process shown in FIG. 6.
Figure 8B:
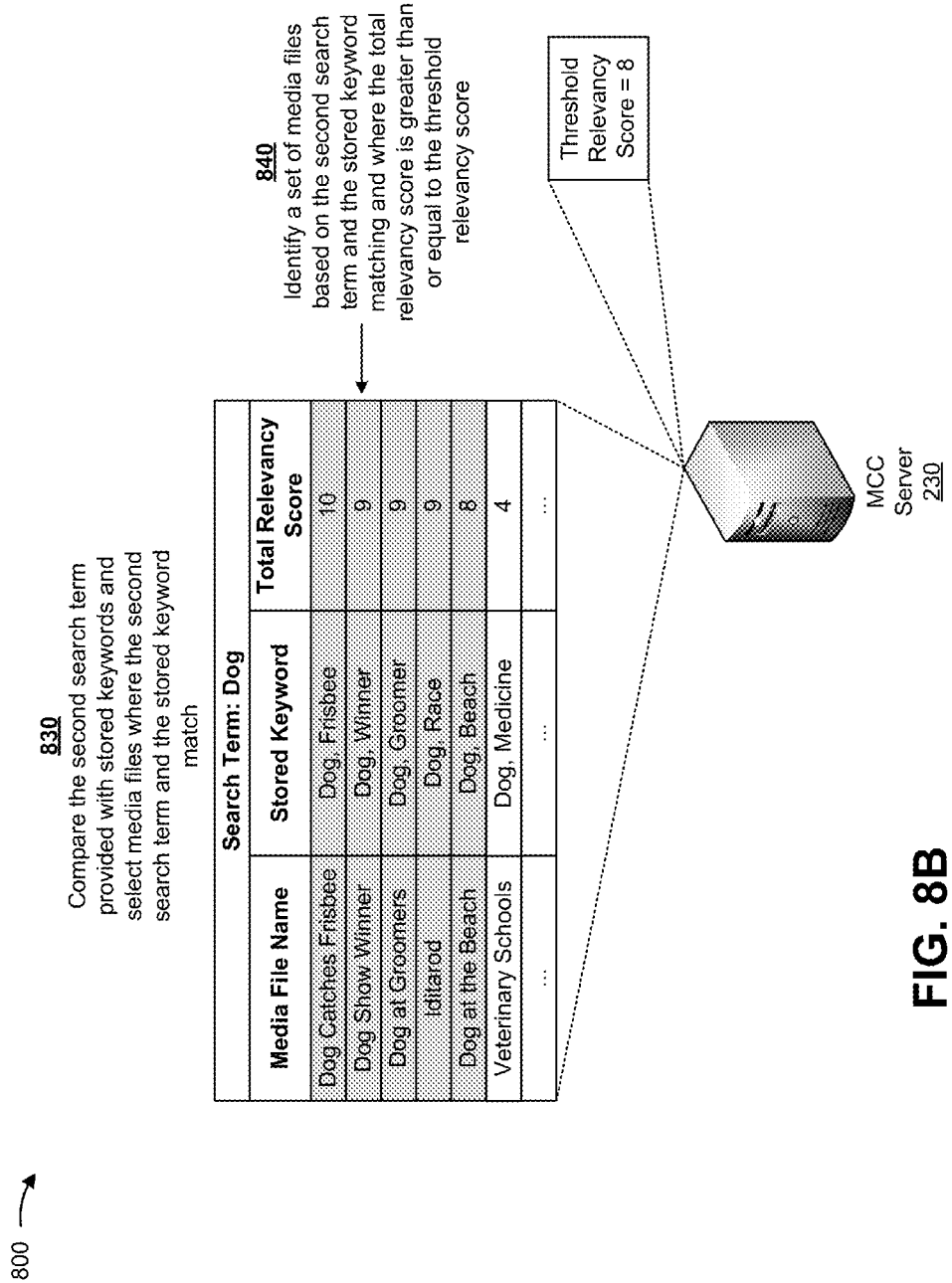
Figure 8C:
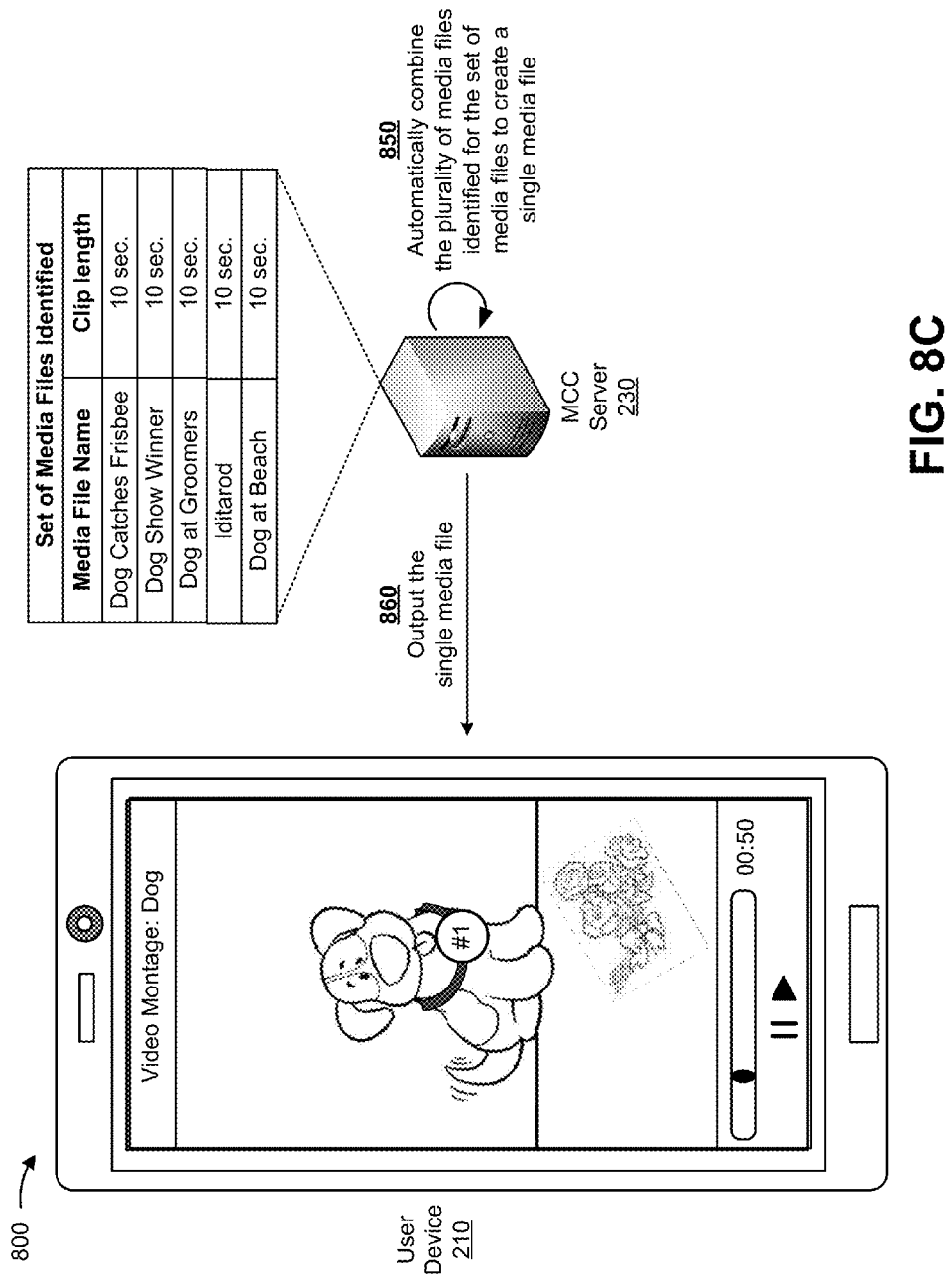

FIGS. 8A-8C are diagrams of an example implementation 800 relating to example process 600 shown in FIG. 6. FIGS. 8A-8C show an example of using an automated media clipping and combination system a second time, using a same search term that a user previously provided.

As shown in FIG. 8A, assume a user of user device 210 desires to obtain a single media file, by combining media files, related to a second search term provided by the user, where the second search term matches a search term provided at an earlier time (e.g., the user desires a second video montage combining video clips related to dogs and provides the same search term=Dog), that the user provided previously.

As shown in FIG. 8A, and by reference number 810, the user provides the second search term (e.g., the user of user device 210 enters the second search term=Dog) into an MCC application (e.g., MCC Application) on user device 210 and associated with a MCC service provider. As shown in FIG. 8A, and by reference number 820, MCC server 230 receives a request for a single media file, from user device 210, related to the second search term.

As shown in FIG. 8B, assume that MCC server 230 has a threshold relevancy score equal to 8. As shown in FIG. 8B, and by reference number 830, MCC server 230 compares the second search term (e.g., the second search term=Dog) with stored keywords and identifies media files based on the second search term matching a stored keyword. MCC server 230 identifies six media files (e.g., video clips) entitled "Dog Catches Frisbee," "Dog Show Winner," "Dog at Groomers," "Iditarod," "Dog at the Beach," and "Veterinary Schools," where each of the media files is associated with a stored keyword=dog.

As shown in FIG. 8B, assume one month after a search was first performed using the search term, the total relevancy score for the video clip entitled "Iditarod" increased from a total relevancy score=7, as shown in FIG. 7B, to a total relevancy score=9. Assume also that additional media files (e.g., video clip entitled "Dog at the Beach") were obtained by MCC server 230. As shown in FIG. 8B, and by reference number 840, MCC server 230 identifies a set of media files, including the media files where the second search term matches the stored keyword, and where the media files meet an additional criteria of each of the media files having a total relevancy score greater than or equal to a threshold relevancy score (e.g., identifying the video clip entitled "Dog Catches Frisbee" with a total relevancy score=10; identifying the video clip entitled "Dog Show Winner" with a total relevancy score=9; identifying the video clip entitled "Dog at Groomers" with a total relevancy score=9; identifying the video clip entitled "Iditarod" with a total relevancy score=9; identifying the video clip entitled "Dog At the Beach" with a total relevancy score=8; etc.).

As shown in FIG. 8C, and by reference number 850, MCC server 230 automatically combines the media files, identified for the set of media files, to create a new single media file (e.g., combining the video clip entitled "Dog Catches Frisbee" and 10 seconds in length, the video clip entitled "Dog Show Winner" and 10 seconds in length, the video clip entitled "Dog at Groomers" and 10 seconds in length, combining the video clip entitled "Iditarod" and 10 seconds in length, and combining the video clip entitled "Dog at the Beach" to dogs to create a single video montage, 50 seconds in length; etc.). The new single media file is created, using a different set of media files identified as related to the second search, where the second search term matches the search term used at a prior time (e.g., one month earlier). Additionally, the user of user device 210 may also access the single media file previously, created, as shown in FIG. 7C.

The new single media file related to the second search term is different from the single media file related to the search term where the search term and the second search term match. This is, for example, because of a change in the total relevancy score for the media files over a period of time (e.g., the video clip entitled "Iditarod" was shared frequently, thereby increasing the total relevancy score for the video clip, and resulted in the video clip being included in the second video montage) and because new media files (e.g., "Dog at the Beach") were added to MCC server 230.

As shown in FIG. 8C, and by reference number 860, MCC server 230 outputs the single media file to user device 210 (e.g., providing a 50 second video montage automatically created by combining video clips with the associated keyword=dog and having a relevancy score greater than or equal to 8). The user of user device 210 may access the single media file on a display of user device 210 (e.g., the user may watch the second video montage of dogs including an additional video clip from the video montage created one month earlier).

As indicated above, FIGS. 8A-8C are provided merely as an example. Other examples are possible and may differ from what was described with regard to FIGS. 7A-7C.

In this way, a single media file may be automatically created by combining media files, identified for a set of media files and obtained from one or more sources (e.g., one or more user devices), determined to be of interest to viewers based on various relevancy factors and related to a search term provided by a user. Additionally, the MCC server may save processing time and resources by efficiently and accurately identifying media files for a set of media files used to create a single media file in response to user's request. In some implementations, a new single media file may be created based on changes to the various relevancy factors over a period of time for the same search term provided by the user at a later time.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
one or more server devices to:
obtain a media file from a user device;
associate keywords with the media file;
determine a relevancy score for the media file based on relevancy factors,
the relevancy factors including:
a measure of popularity of the media file based on a set of positive actions and a set of negative actions performed on the media file,
a first weight assigned to a first keyword of the keywords associated with the media file, and
a second weight assigned to a second keyword of the keywords associated with the media file, the first weight being different from the second weight;
receive a search term from the user device;
determine whether the search term matches at least one of the keywords associated with the media file;
generate a threshold relevancy score and a combined threshold relevancy score based on historical data;
identify a set of media files based on the search term and based on combined relevancy score satisfying the combined threshold relevancy score,
the combined relevancy score being a sum of relevancy scores of the set of media files, and
the set of media files including the media file based on the search term matching at least one of the keywords associated with the media file and based on the relevancy score for the media file satisfying the threshold relevancy score;
automatically create a single media file by combining the set of media files into the single media file; and
output the single media file for presentation on the user device.

2. The system of claim 1, where the one or more server devices are further to:
compare the search term with stored keywords; and
where the one or more server devices, when identifying the set of media files, are to:
identify one or more media files associated with a stored keyword, of the stored keywords, that matches the search term.

3. The system of claim 1, where the one or more server devices are further to:
compare the search term with stored keywords; and
provide a notification that the single media file could not be created based on the search term not matching any of the stored keywords.

4. The system of claim 1, where the one or more server devices are further to:
determine the relevancy factors for determining the relevancy score for the media file; and
where the one or more server devices, when determining the relevancy score for the media file, are to:
determine the relevancy score for the media file based on a level of importance assigned to the relevancy factors.

5. The system of claim 4, where the level of importance is determined without user input specifying the level of importance assigned to each of the relevancy factors.

6. The system of claim 1, where the one or more server devices, when identifying the set of media files, are to:
select media files for the set of media files based on a relevancy score for each of the set of media files satisfying the threshold relevancy score.

7. The system of claim 1, where the keywords are generated based on at least one of:
metadata, or
one or more comments provided by a user accessing the media file.

8. A computer-readable medium storing instructions, the instructions comprising:
one or more instructions that, when executed by one or more processors, cause the one or more processors to:
obtain a media file from a user device;
associate keywords with the media file;
determine a relevancy score for the media file based on relevancy factors,
the relevancy factors including:
a measure of popularity of the media file based on a set of positive actions and a set of negative actions performed on the media file,
a first weight assigned to a first keyword of the keywords associated with the media file, and
a second weight assigned to a second keyword of the keywords associated with the media file,
the first weight being different from the second weight;
receive a search term from the user device;
determine whether the search term matches at least one of the keywords associated with the media file;
generate a threshold relevancy score and a combined threshold relevancy score based on historical data;
identify a set of media files based on the search term and based on a combined relevancy score satisfying the combined threshold relevancy score,
the combined relevancy score being a sum of relevancy scores of the set of media files, and
the set of media files including the media file based on the search term matching at least one of the keywords associated with the media file and based on the relevancy score for the media file satisfying the threshold relevancy score;
automatically create a single media file by combining the set of media files into the single media file; and
output the single media file for presentation on the user device.

9. The computer-readable medium of claim 8, where the keywords are generated based on information provided with the media file.

10. The computer-readable medium of claim 8, where the one or more instructions, when executed by the one or more processors, further cause the one or more processors to:
determine a ranking for the media file; and
where the one or more instructions, that cause the one or more processors to automatically create the single media file by combining the set of media files, cause the one or more processors to:
automatically create the single media file by combining the set of media files based on the ranking.

11. The computer-readable medium of claim 10, where the one or more instructions, that cause the one or more processors to determine the ranking, cause the one or more processors to:
determine the ranking based on the relevancy score for the media file.

12. The computer-readable medium of claim 10, where the one or more instructions, that cause the one or more processors to determine the ranking, cause the one or more processors to:
determine the ranking based on a file size for the media file.

13. The computer-readable medium of claim 10, where the one or more instructions, that cause the one or more processors to determine the ranking, cause the one or more processors to:
determine the ranking based on a measure of quality for the media file.

14. The computer-readable medium of claim 8, where the measure of popularity of the media file is determined based on a quantity of actions performed on the media file.

15. A method, comprising:
obtaining, by a server device, a media file from a user device;
associating, by the server device, keywords with the media file;
determining, by the server device, one or more relevancy scores for the media file based on relevancy factors,
the relevancy factors including:
a measure of popularity of the media file based on a set of positive actions and a set of negative actions performed on the media file, and
a first weight assigned to a first keyword of the keywords associated with the media file, and
a second weight assigned to a second keyword of the keywords associated with the media file,
the first weight being different from the second weight;
receiving, by the server device, a search term from the user device;
determine, by the server device, whether the search term matches at least one of the keywords associated with the media file;
generating, by the server device, a threshold relevancy score and a combined threshold relevancy score based on historical data;
identifying, by the server device, a set of media files based on a combined relevancy score satisfying the combined threshold relevancy score,
the combined relevancy score being a sum of relevancy scores of the set of media files, and
the set of media files including the media file based on the search term matching at least one of the keywords associated with the media file and based on the one or more relevancy scores for the media file satisfying the threshold relevancy score;
automatically creating, by the server device, a single media file by combining the set of media files into the single media file; and
outputting, by the server device, the single media file for presentation on the user device.

16. The method of claim 15, where the measure of popularity for the media file is based on a quantity of accesses to the media file by one or more users of a plurality of user devices.

17. The method of claim 15, where the measure of popularity for the media file is based on at least one of fast-forwarding or rewinding of the media file by one or more users of a plurality of user devices.

18. The method of claim 15, where the measure of popularity for the media file is determined based on a reaction to the media file by one or more users of a plurality of user devices.

19. The method of claim 15, where the keywords are generated based on information provided with the media file.

20. The method of claim 15, where identifying the set of media files comprises:
identifying the set of media files based on a relevancy score for each of the set of media files satisfying the threshold relevancy score.

* * * * *